(12) United States Patent
Miyaoka

(10) Patent No.: US 12,158,516 B2
(45) Date of Patent: Dec. 3, 2024

(54) CONTROL DEVICE, CONTROL METHOD AND SENSOR CONTROL SYSTEM

(71) Applicant: SONY GROUP CORPORATION, Tokyo (JP)

(72) Inventor: Hirosada Miyaoka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 744 days.

(21) Appl. No.: 17/290,917

(22) PCT Filed: Oct. 29, 2019

(86) PCT No.: PCT/JP2019/042272
§ 371 (c)(1),
(2) Date: May 3, 2021

(87) PCT Pub. No.: WO2020/100569
PCT Pub. Date: May 22, 2020

(65) Prior Publication Data
US 2021/0389448 A1 Dec. 16, 2021

(30) Foreign Application Priority Data
Nov. 14, 2018 (JP) ................. 2018-213690

(51) Int. Cl.
*G01S 13/86* (2006.01)
*G01S 13/931* (2020.01)
(Continued)

(52) U.S. Cl.
CPC .......... *G01S 13/867* (2013.01); *G01S 13/931* (2013.01); *H01Q 1/3233* (2013.01); *H01Q 3/30* (2013.01)

(58) Field of Classification Search
CPC ... G01S 13/867; G01S 13/931; H01Q 1/3233; H01Q 3/30
See application file for complete search history.

(56) References Cited

U.S. PATENT DOCUMENTS

| 5,558,440 A | 9/1996 | Miller |
| 8,193,920 B2 * | 6/2012 | Klotz ................... G01S 13/931 340/425.5 |

(Continued)

FOREIGN PATENT DOCUMENTS

| JP | 2002-286839 A | 10/2002 |
| JP | 2003-307561 A | 10/2003 |

(Continued)

OTHER PUBLICATIONS

International Search Report and Written Opinion of PCT Application No. PCT/JP2019/042272, issued on Dec. 24, 2019, 07 pages of ISRWO.

*Primary Examiner* — Peter M Bythrow
(74) *Attorney, Agent, or Firm* — CHIP LAW GROUP

(57) ABSTRACT

Provided is a control device which includes a radar device that executes a first mode of detecting at least any one of a relative speed and a relative distance with respect to an object in a first area and a second mode of detecting at least any one of a relative speed and a relative distance with respect to an object in a second area in a field wider than that of the first area; and a controller which switches a mode that is executed by the radar device to any one of the first mode and the second mode.

20 Claims, 20 Drawing Sheets

(51) Int. Cl.
*H01Q 1/32* (2006.01)
*H01Q 3/30* (2006.01)

(56) References Cited

U.S. PATENT DOCUMENTS

| | | | |
|---|---|---|---|
| 10,247,809 B2* | 4/2019 | Testar | G01S 13/887 |
| 2003/0112172 A1* | 6/2003 | Shinoda | G01S 13/4463 |
| | | | 342/149 |
| 2003/0164791 A1* | 9/2003 | Shinoda | H01Q 3/2605 |
| | | | 342/149 |
| 2006/0158369 A1* | 7/2006 | Shinoda | H01Q 3/06 |
| | | | 342/146 |
| 2007/0152870 A1* | 7/2007 | Woodington | G01S 13/528 |
| | | | 342/72 |
| 2018/0149740 A1* | 5/2018 | Tamura | G01S 13/867 |
| 2018/0151073 A1* | 5/2018 | Minemura | G08G 1/166 |
| 2018/0174461 A1* | 6/2018 | Ito | B60T 8/17 |
| 2019/0277962 A1* | 9/2019 | Ingram | G01S 13/865 |
| 2019/0361114 A1* | 11/2019 | Kim | H04B 7/0413 |
| 2021/0302570 A1* | 9/2021 | Ichiki | G01S 7/41 |
| 2022/0390550 A1* | 12/2022 | Markel | G01S 7/021 |

FOREIGN PATENT DOCUMENTS

| | | |
|---|---|---|
| JP | 2009-181315 A | 8/2009 |
| JP | 2018-169190 A | 11/2018 |

* cited by examiner

CONTROL DEVICE, CONTROL METHOD AND SENSOR CONTROL SYSTEM

CROSS REFERENCE TO RELATED APPLICATIONS

This application is a U.S. National Phase of International Patent Application No. PCT/JP2019/042272 filed on Oct. 29, 2019, which claims priority benefit of Japanese Patent Application No. JP 2018-213690 filed in the Japan Patent Office on Nov. 14, 2018. Each of the above-referenced applications is hereby incorporated herein by reference in its entirety.

FIELD

The present disclosure relates to a control device, a control method, and a sensor control system.

BACKGROUND

In recent years, autonomous driving cars capable of autonomous travel without driving operations performed by the driver and automobiles with ADAS (advanced driver-assistance systems), such as a cruise control function of maintaining a constant travel speed without operations on the acceleration pedal by the driver and an active cruise control function of controlling the space to a preceding vehicle in addition to the travel speed, have been in active development.

In such an automobile, for example, a sensor, such as a camera, a LiDAR (Light Detection and Ranging) or a millimeter-wave radar (simply referred to as radar below), is installed as a sensor corresponding to the "eyes" of a human. For example, a millimeter-wave radar can be effective "eyes" of an automobile in that the millimeter-wave radar is capable of specifying the direction, distance, and relative speed of an object that is present around the vehicle.

CITATION LIST

Patent Literature

Patent Literature 1: Japanese Unexamined Patent Application Publication No. 2002-286839
Patent Literature 2: Japanese Unexamined Patent Application Publication No. 2003-307561
Patent Literature 3: Japanese Patent No. 5558440

SUMMARY

Technical Problem

When a millimeter-wave radar is used as "eyes" of an automobile, however, depending on the circumstances of a subject vehicle or the circumstances of the surroundings, a problem that an object present around the subject vehicle cannot be detected correctly occurs.

The disclosure thus proposes a control device, a control method, and a sensor control system that make it possible to correctly detect a surrounding object according to the circumstances.

Solution to Problem

To solve the above-described problem, a control device according to one aspect of the present disclosure comprising: a radar device configured to execute a first mode of detecting at least any one of a relative speed and a relative distance with respect to an object in a first area and a second mode of detecting at least any one of a relative speed and a relative distance with respect to an object in a second area in a field wider than that of the first area; and a controller configured to switch a mode that is executed by the radar device to any one of the first mode and the second mode.

DESCRIPTION OF EMBODIMENTS

Embodiments of the disclosure will be described in detail below based on the accompanying drawings. In the embodiments below, the same components are denoted with the same reference numbers and thus redundant description is omitted.

The disclosure will be descried according to the order of items represented below.

1. First Embodiment
   1.1 Rader Detection System
   1.2 Phased Array Antenna
   1.3 Scan Mode
      1.3.1 Linked Mode
      1.3.2 Independent Mode
   1.4 Operation Flow
   1.5 Function and Effect
2. Second Embodiment
   2.1 Rader Detection Mode
   2.2 Configuration
   2.3 Operation Flow
   2.4 Function and Effect
3. Third Embodiment
   3.1 Frequency Band and Width Resolution
   3.2 Configuration
   3.3 Operation Flow
   3.4 Function and Effect
4. Fourth Embodiment
   4.1 Configuration
   4.2 Operation Flow
   4.3 Function and Effect
5. Application Example First of all, a control device, a control method, and a sensor control system according to a first embodiment will be described in detail.

When a millimeter-wave radar is used as the "eyes" of an automobile, for example, under the circumstances where many reflections occur, an object that is present around a subject vehicle may not be detected correctly because of multipath propagation caused by indirect waves.

Figure 1:
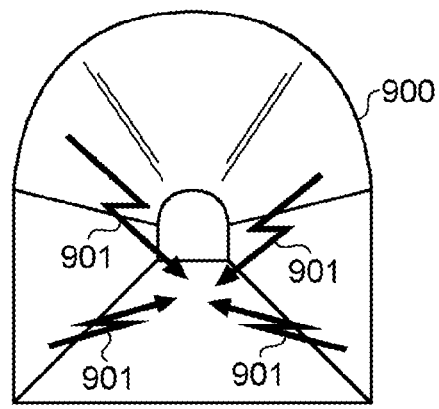
FIG. 1 is a diagram for explaining multipath propagation resulting from indirect waves that occur in a tunnel.
Figure 2:
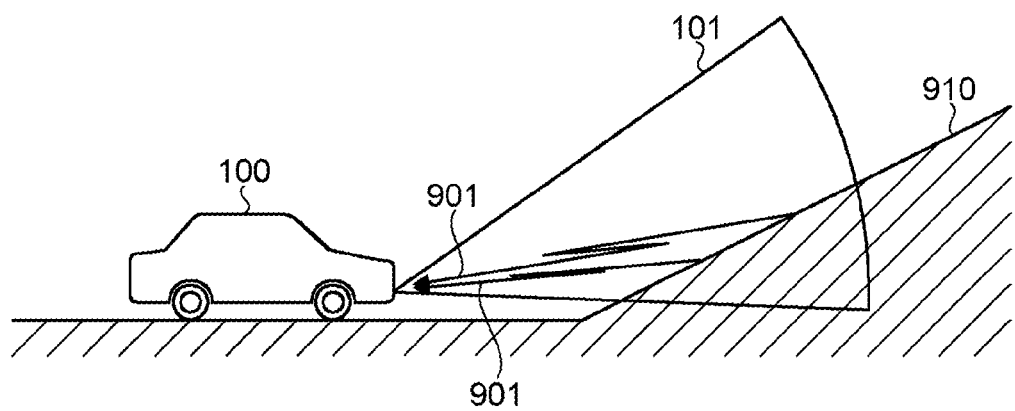
FIG. 2 is a diagram for explaining multipath propagation resulting from indirect waves that occur before an ascending slope.

For example, as illustrated in FIG. 1, when a subject vehicle is traveling through a tunnel 900, many indirect waves 901 occur because of reflections on the inner wall of the tunnel 900 and thus it is difficult to correctly detect an object that is present around the subject vehicle with a radar. Similarly, as exemplified in FIG. 2, when there is a steep ascending slope 910 ahead of a subject vehicle 100, transmission waves (a transmission signal) 101 reflect on the steep ascending road surface and many indirect waves 901 occur and thus it is difficult to detect an object ahead of the subject vehicle 100 with the radar.

Figure 3:
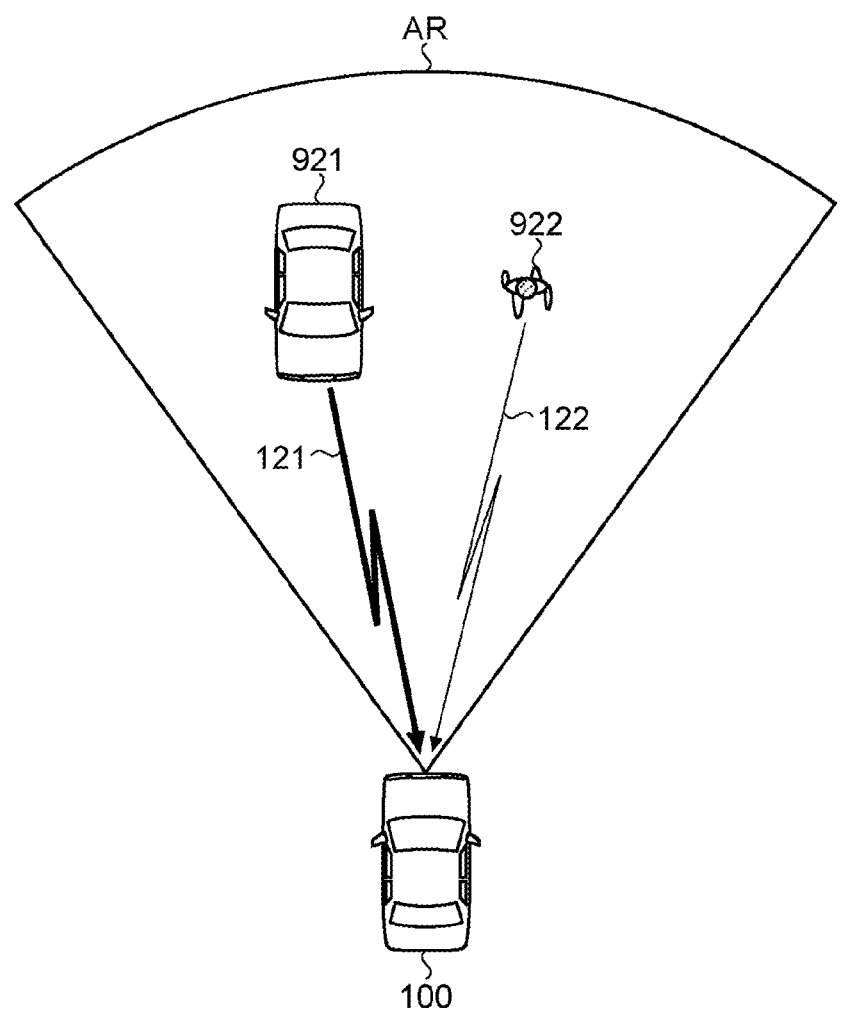
FIG. 3 is a diagram for explaining echo signals in the case where a pedestrian and an automobile are present in a beam area.

As exemplified in FIG. 3, when a relatively small object, such as a pedestrian 922, and a large object, such as an automobile 921, are present in an effective area (beam area below) AR that radio waves of a millimeter-wave radar reach, the signal intensity (radio wave intensity) of an echo signal 122 obtained because a transmission signal is reflected on the pedestrian 922 and comes back is a significantly small value compared to the signal intensity (radio wave intensity) of an echo signal 121 obtained by because a transmission signal is reflected on the automobile 921 and come back. For this reason, in such a case, the echo signal 122 that is reflected on the small object, such as the pedestrian 922, and comes back may be buried in the echo signal 121 that is reflected on the large object, such as the automobile 921, and comes back and it may be difficult to detect the small object, such as the pedestrian 922.

Thus, in the embodiment, the control device, the control method, and the sensor control system that make it possible to detect an object correctly according to an area that the subject vehicle 100 travels, a terrain, and surrounding circumstances, or the like, will be described, taking examples.

1.1 Rader Detection System

Figure 4:
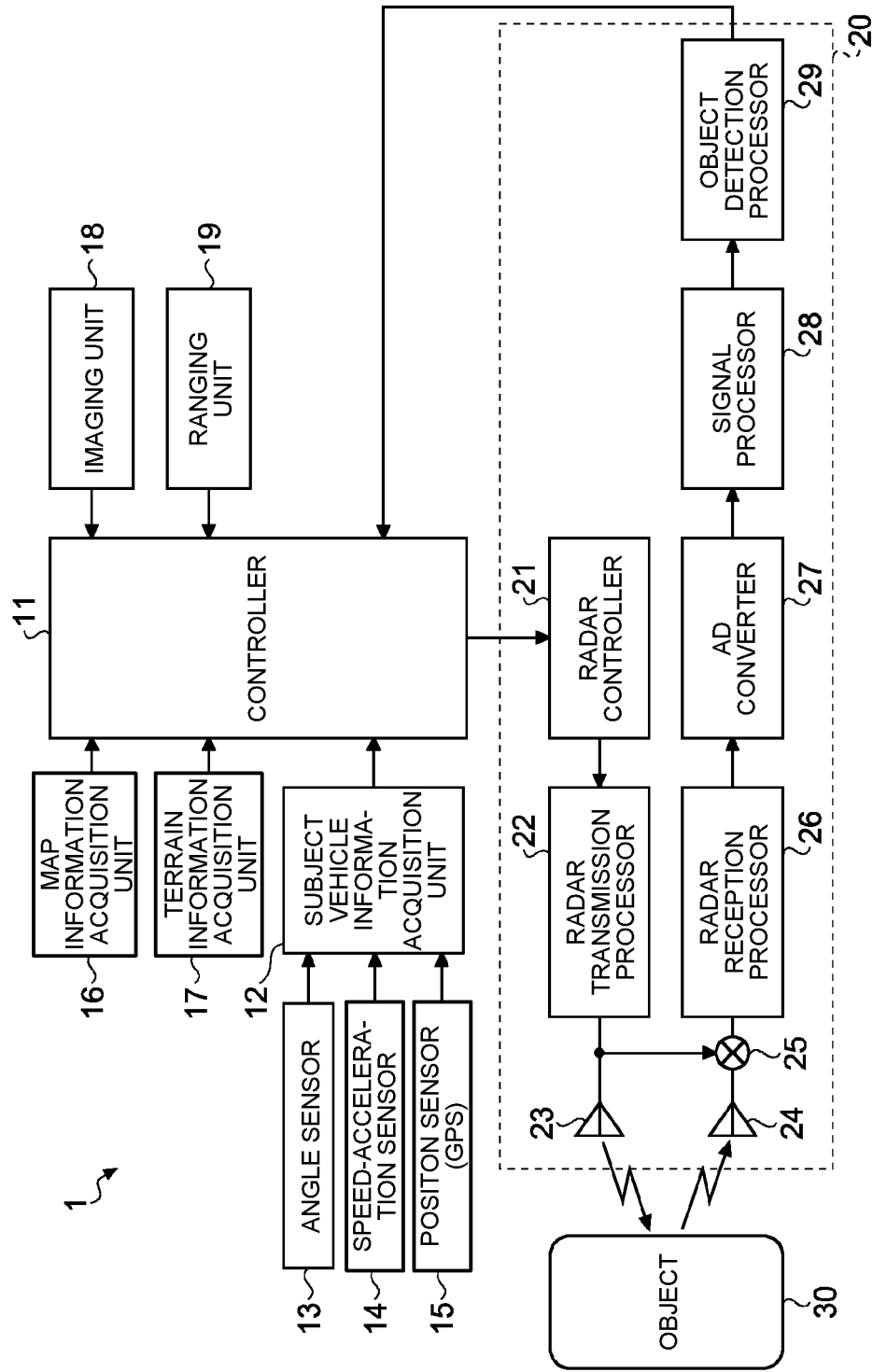
FIG. 4 is a block diagram illustrating an example of a schematic configurations of a radar detection system according to a first embodiment.

FIG. 4 is a block diagram illustrating an example of a schematic configuration of a radar detection system according to the embodiment. As illustrated in FIG. 4, a radar detection system 1 includes a controller 11, a subject vehicle information acquisition unit 12, an angle sensor 13, a speed-acceleration sensor 14, a position sensor 15, a map information acquisition unit 16, a terrain information acquisition unit 17, an imaging unit 18, a ranging unit 19, and a radar device 20.

The angle sensor 13, for example, consists of a gyro sensor, or the like, and detects a direction in which the subject vehicle 100 is oriented, a slope to the horizontal plane, etc.

The speed-acceleration sensor 14, for example, detects a speed and acceleration of the subject vehicle 100 with respect to a fixed object, such as the ground.

The position sensor 15, for example, acquires a position of the subject vehicle 100, or the like, using the GPS (Global Positioning System), or the like.

The subject vehicle information acquisition unit 12 acquires information of the orientation and slope of the subject vehicle 100, or the like, information of the speed and acceleration of the subject vehicle 100, or the like, and information of the position of the subject vehicle 100, or the like, from the angle sensor 13, the speed-acceleration sensor 14 and the position sensor and inputs these sets of information to the controller 11.

The map information acquisition unit 16, for example, acquires map data on an area to which the subject vehicle 100 belongs and inputs the acquired map data to the controller 11. Note that the map information acquisition unit 16 may acquire the map data on the area to which the subject vehicle 100 belongs from a server not illustrated in the drawing via a given network or may acquire the map data on the area to which the subject vehicle 100 belongs from wide-area map data that is stored in a storage that is not illustrated in the drawing.

The terrain information acquisition unit 17, for example, for example, acquires terrain data on the area to which the subject vehicle 100 belongs and inputs the acquired terrain data to the controller 11. Note that the terrain information acquisition unit 17 may acquire the terrain data on the area to which the subject vehicle 100 belongs from a server not illustrated in the drawing via a given network or may acquire the map data on the area to which the subject vehicle 100 belongs from wide-area terrain data that is stored in a storage that is not illustrated in the drawing. The area of the terrain data that is acquired by the terrain information acquisition unit 17 need not necessarily match the area of the map data that is acquired by the map information acquisition unit 16.

The imaging unit 18, for example, consists of one or more image sensors (also referred to as cameras) and captures images of the surroundings of the subject vehicle 100 and inputs image data thus acquired to the controller 11.

The ranging unit 19, for example, consists of one or more LiDARs (Light Detection and Ranging or Laser Imaging Detection and Ranging) and measures a distance to an object that is present around the subject vehicle 100 and inputs the result thereof to the controller 11. Note that the LiDAR can contain a TOF (Time of Flight) sensor.

The radar device 20, for example, includes a radar controller 21, a radar transmission processor 22, a transmitting antenna 23, a receiving antenna 24, a mixer 25, a radar reception processor 26, an AD converter 27, a signal processor 28, and an object detection processor 29.

The radar controller 21 outputs a chirp control signal for controlling the radar transmission processor 22. The radar transmission processor 22, for example, includes a local oscillator and a power amplifier. The local oscillator, for example, generates a (chirped) local signal whose frequency changes over time based on the chirp control signal from the radar controller 21. The power amplifier, for example, amplifies the local signal that is generated by the local oscillator. The local signal that is amplified by the power amplifier is input to the transmitting antenna (Tx) 23.

The transmitting antenna 23 sends out, as a transmission signal, the local signal that is amplified by the power amplifier of the radar transmission processor 22 toward a given direction. The receiving antenna (Rx) 24 receives an echo signal obtained because the transmission signal that is transmitted from the transmitting antenna 23 is reflected on an object 30 and returns. The echo signal that is received by the receiving antenna 24 is input to the mixer 25.

The mixer 25 generates a beat signal by multiplying the local signal that is output from the radar transmission processor 22 by the echo signal that is received by the receiving antenna (RX) 24. The beat signal is converted into a digital value via the radar reception processor 26 and the AD converter 27 and then is input to the signal processor 28.

The signal processor 28 performs, on the input beat signal that is a digital value, given processing for acquiring information on the source of generation of the echo signal (for example, the object 30) from the beat signal and then inputs the processed beat signal to the object detection processor 29.

Based on the input beat signal, the object detection processor 29 calculates the distance from the subject vehicle 100 to the object 30, the orientation of the object 30 with respect to the subject vehicle 100, the relative speed (vector) between the subject vehicle 100 and the object 30, etc., and inputs the results of calculation to the controller 11. The object detection processor 29 may detect the size of the object 30 (the vertical direction and/or horizontal direction) based on the beat signal that is input.

The controller 11 controls each unit of the above-described radar detection system 1 and cooperates with a vehicle control system not illustrated in the drawing and acquires information on the object that is present around the subject vehicle 100 and inputs the acquired information to the vehicle control system as required.

The controller 11 may determine reliability of the information on the object 30 that is input from the object detection processor 29 (the distance from the subject vehicle 100 to the object 30, the orientation of the object 30 with respect to the subject vehicle 100, the relative speed (vector) between the subject vehicle 100 and the object 30) by taking consistency between the information on the object 30 that is input from the object detection processor 29 and information that is acquired by the imaging unit 18 and the ranging unit 19.

1.2 Phased Array Antenna

Figure 5:
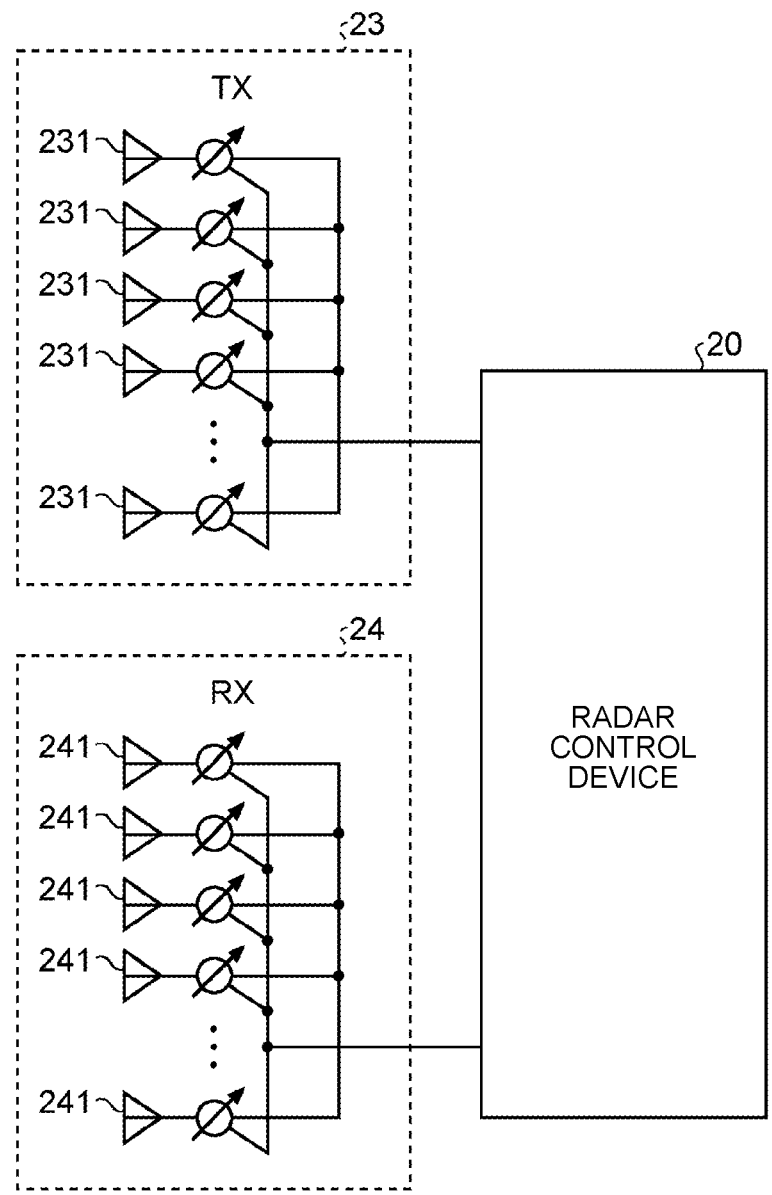
FIG. 5 is a schematic diagram illustrating an example of schematic configurations of a transmitting antenna and a receiving antenna according to the first embodiment.

FIG. 5 is a schematic diagram illustrating an example of schematic configurations of the transmitting antenna and the receiving antenna according to the embodiment. As illustrated in FIG. 5, a phased array antenna in which a plurality of antenna elements 231 or 241 are arranged in a two-dimensional array can be used as each of the transmitting antenna 23 and the receiving antenna 24 according to the embodiment. Using the phased array antennae makes it possible to control the area and direction (also referred to as directionality) and intensity of the transmission signal, etc., according to a relative phase of a coefficient of excitation of the antenna elements 231 or 241.

1.3 Scan Mode

When phased array antenna like that exemplified in FIG. 5 is used as the transmitting antenna 23, appropriately selecting the number of and a combination of the antenna elements 231 that are used to send out a transmission signal makes it possible to control the extent (also referred to as beam width below), effective distance (also referred to as beam distance below), sending direction (also referred to as beam direction below), etc., of the transmission signal (also referred to as beam below). Similarly, appropriately selecting the number and a combination of the antenna elements 241 used to receive the echo signal makes it possible to control the directionality of the receiving antenna 24 with respect to the echo signal.

1.3.1 Linked Mode

Figure 7:
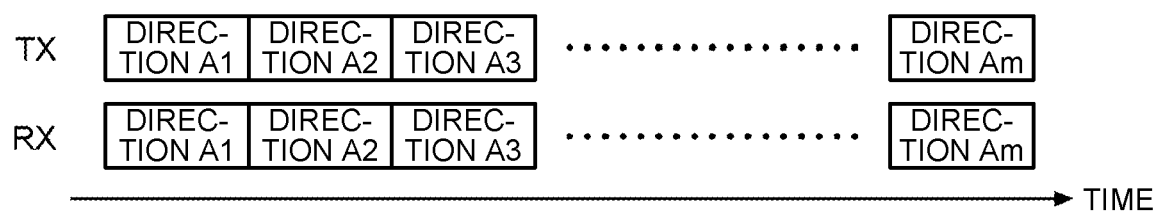
FIG. 7 is a timing chart for explaining the linked mode according to the first embodiment.
Figure 8:
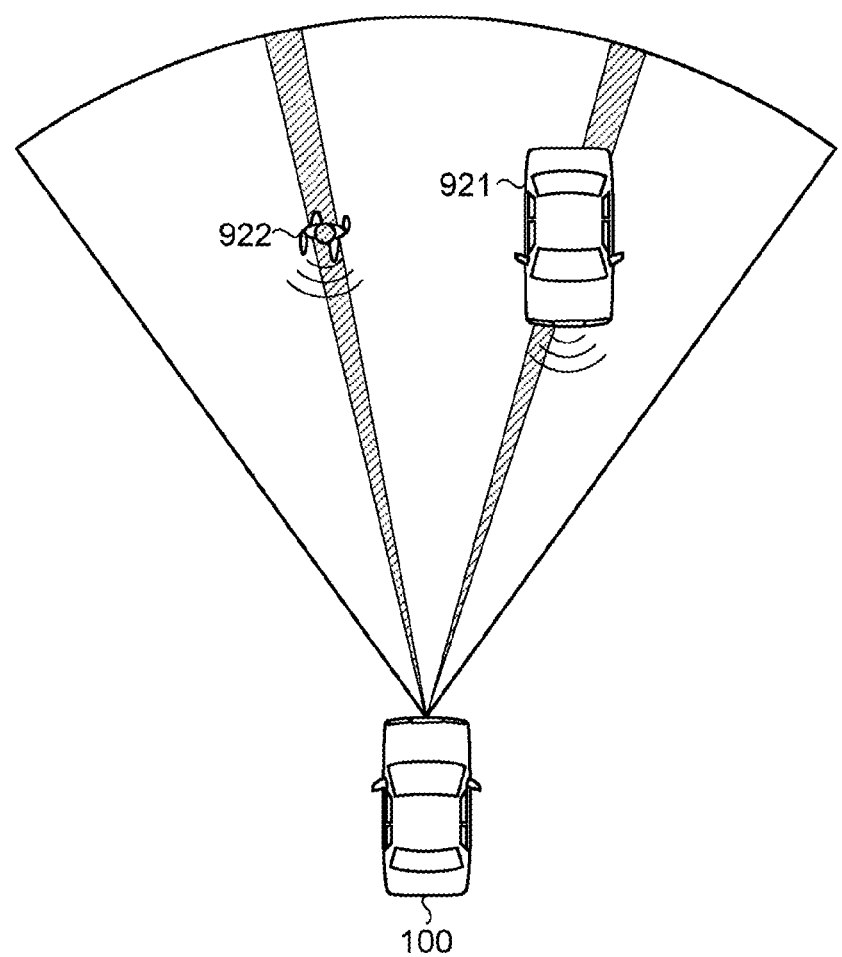
FIG. 8 is a diagram for explaining echo signals in the case where a pedestrian and an automobile are present in the beam area while the linked mode is executed according to the first embodiment.

As exemplified in FIG. 6, in the case where directionality (referred to as directionality of the transmitting antenna 23 below) is imparted to a transmission signal to be sent out of the transmitting antenna 23 and directionality (referred to as directionality of the receiving antenna 24 below) is set for an echo signal to be received by the receiving antenna 24, when a scan is performed with the direction of the directionality of the transmitting antenna 23 and the direction of the directionality of the receiving antenna 24 being linked with each other (the scan mode is referred to as a linked mode below) as exemplified in FIG. 7, because the object, such as the automobile 921, with a high signal intensity (radio wave intensity) of the echo signal and the object, such as the pedestrian 922, with a low signal intensity (radio wave intensity) of the echo signal are detected at different sets of timing as illustrated in FIG. 8, it is possible to reduce failures in detecting objects, such as the pedestrian 922, with a low signal intensity (radio wave intensity) of the echo signal. Note that the linked mode corresponds to a specific example of the "first mode" in the disclosure.

1.3.2 Independent Mode

Figure 10:
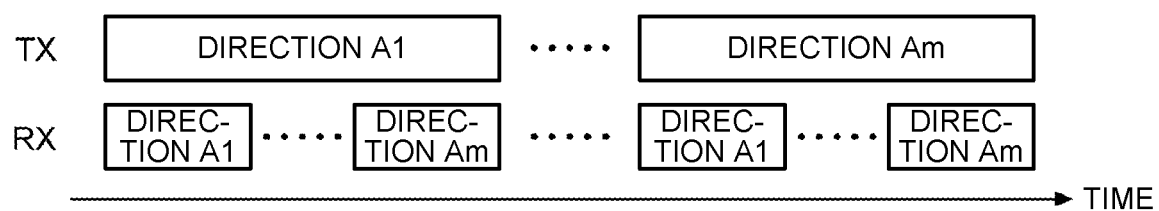
FIG. 10 is a timing chart for explaining the independent mode according to the first embodiment.
Figure 11:
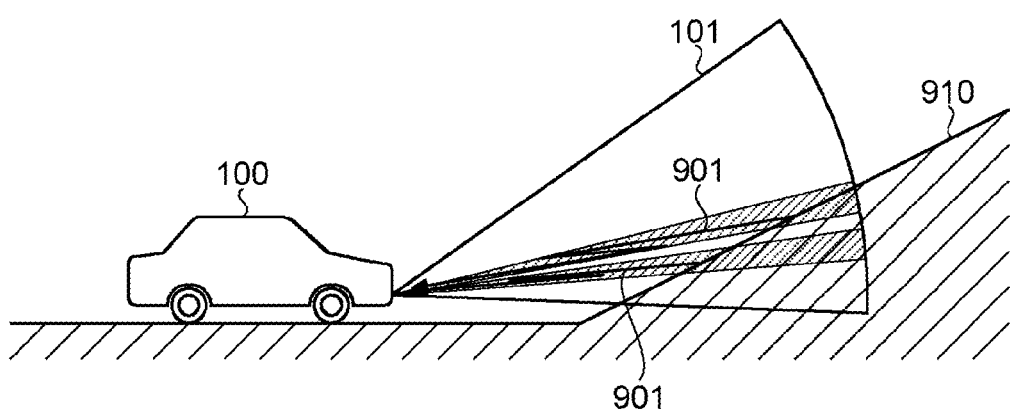
FIG. 11 is a diagram for explaining echo signals in the case where an ascending slope is preset ahead while the independent mode is executed.

On the other hand, as exemplified in FIG. 9, in the case where directionality (referred to as directionality of the transmitting antenna 23 below) is imparted to a transmission signal to be sent out of the transmitting antenna 23 and directionality (referred to as directionality of the receiving antenna 24 below) is set for an echo signal to be received by the receiving antenna 24, when a scan is performed with the direction of the directionality of the transmitting antenna 23 and the direction of the directionality of the receiving antenna 24 being independent of each other (the scan mode is referred to as an independent mode below) as exemplified in FIG. 10, because each indirect wave 901 is detected independently as illustrated in FIG. 11, it is possible to filter multipath propagation and recognize the object correctly. Note that the independent mode corresponds to a specific example of the "second mode" in the disclosure.

In the embodiment, object detection is executed in the independent mode during a travel in an area (specific area below) where indirect waves tend to occur, such as the inside of a tunnel or a road on which a steep slope is present ahead, and object detection is executed in the linked mode in an area other than the area, such as a downtown, where relatively large objects, such as automobiles, and relatively small objects, such as pedestrians, are mixed.

Figure 6:
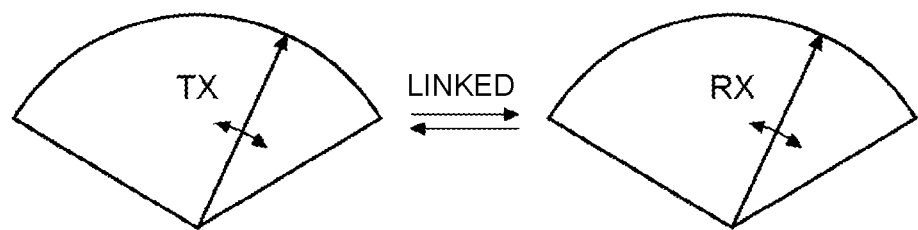
FIG. 6 is a diagram for explaining a linked mode according to the first embodiment.
Figure 9:
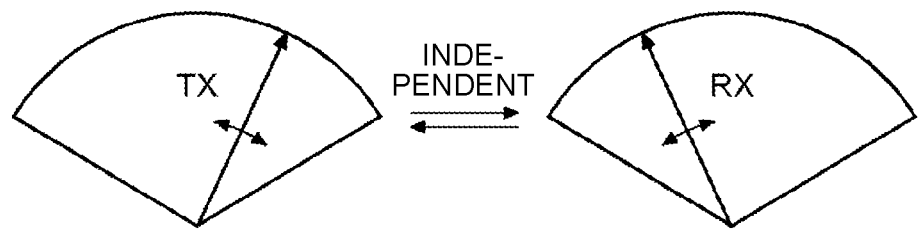
FIG. 9 is a diagram for explaining an independent mode according to the first embodiment.

In FIG. 6 and FIG. 9, Tx denotes a beam area of the transmission signal that is sent out of the transmitting antenna 23 and Rx denotes a beam area of the echo signal that is received by the receiving antenna 24. In FIG. 7 and FIG. 10, Tx denotes the direction of directionality of the transmitting antenna 23 (scan direction) and Rx denotes the direction of directionality of the receiving antenna 24 (scan direction).

1.4 Operation Flow

Figure 12:
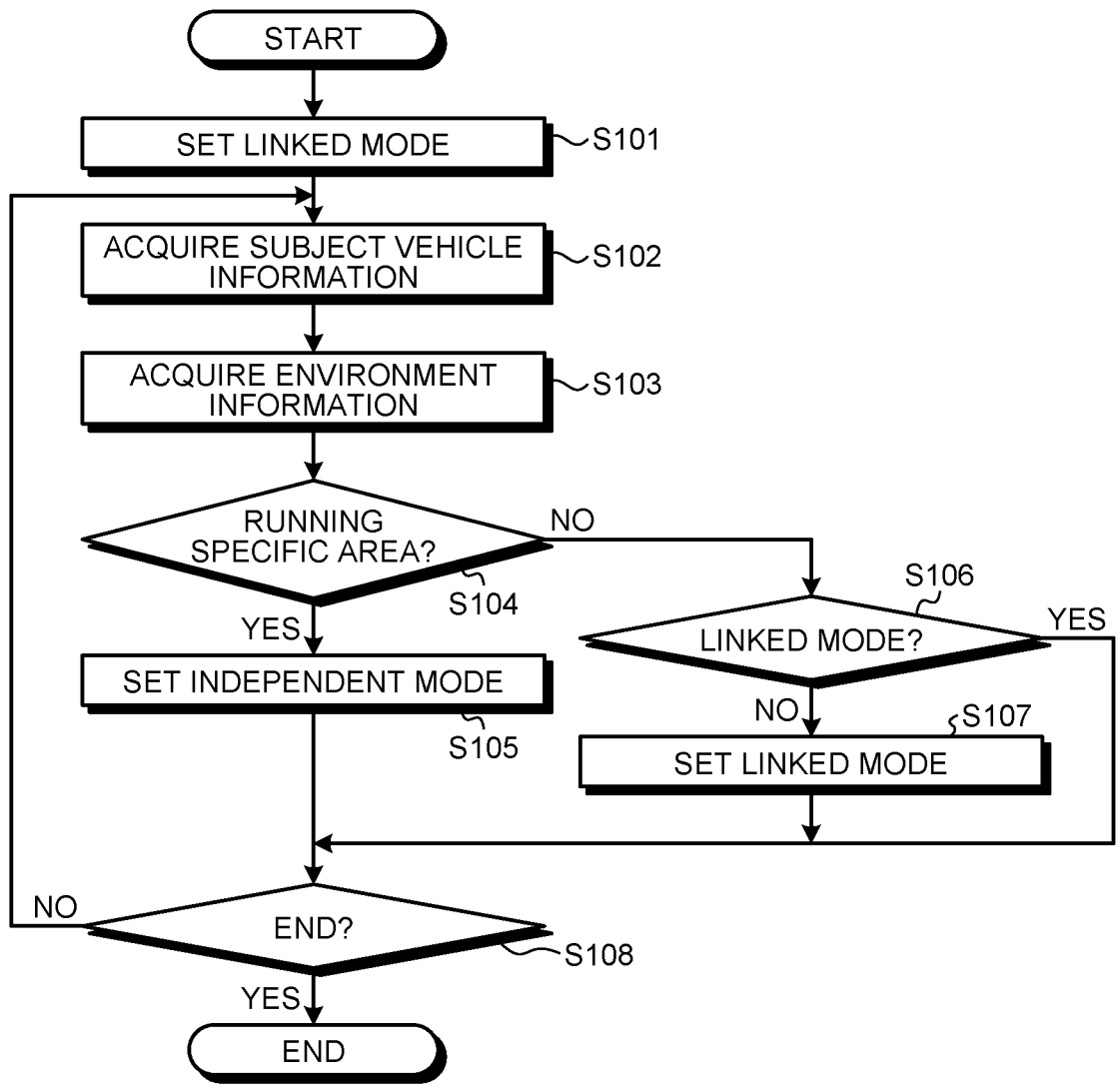
FIG. 12 is a flowchart illustrating an example of general operations of the radar detection system according to the first embodiment.

FIG. 12 is a flowchart illustrating an example of general operations of the radar detection system according to the embodiment. In the following description, operations of the controller 11 are focused on and described.

The operations illustrated in FIG. 12 are, for example, started when ignition is cased in the engine of the subject vehicle 100 or when the shift lever is put in the drive range. As illustrated in FIG. 12, in the operations, first of all, after started, the controller 11 sets a scan in the linked mode in the radar controller 21 (step S101). Thus, right after the start, a scan is performed with the directionality of the transmitting antenna 23 and the directionality of the receiving antenna 24 being linked with each other.

The controller 11 acquires subject vehicle information on the subject vehicle 100 from the subject vehicle information acquisition unit 12 (step S102). Specifically, information of the orientation and slope of the subject vehicle 100, or the like, information of the speed and acceleration of the subject vehicle 100, or the like, and information of the position of the subject vehicle 100, or the like, are input from the subject vehicle information acquisition unit 12 to the controller 11. Information of the size or weight of the subject vehicle 100, the information of the orientation and slope of the subject vehicle 100, or the like, the information of the speed and acceleration of the subject vehicle 100, or the like, and the information of the position of the subject vehicle 100, or the like, are referred to as subject vehicle information below.

The controller 11 acquires environment information on the surrounding of the subject vehicle 100 (step S103). The environment information is, for example, the map data on the area to which the subject vehicle 100 belongs, the terrain data on the area to which the subject vehicle 100 belongs, information on an object that is present around the subject vehicle 100 and the terrain that are specified by analyzing the image data that is acquired by the imaging unit 18, information containing the distance to the object around the subject vehicle 100 that is acquired by the ranging unit 19, etc. Specifically, for example, based on the information, such as the position of the subject vehicle 100 that is acquired from the subject vehicle information acquisition unit 12, etc., the controller 11 acquires the map data on the area to which the subject vehicle 100 belongs from the map information acquisition unit 16 and acquires the terrain data on the area to which the subject vehicle 100 belongs from the terrain information acquisition unit 17. The controller 11 acquires image data obtained by imaging the surroundings of the subject vehicle 100 from the imaging unit 18. The controller 11 further acquires the distance to the object that is present around the subject vehicle 100 from the ranging unit 19.

The controller 11 then determines whether the subject vehicle 100 is currently traveling a specific area from the environment information and the subject vehicle information (step S104). For example, the controller 11 determines whether the subject vehicle 100 is traveling the specific area from the information of the direction in which the subject vehicle 100 is oriented and the slop to the horizontal plane, the information of the speed and/or acceleration of the subject vehicle 100, the information of the position of the subject vehicle 100, etc., the map data on the area to which the subject vehicle 100 belongs, and the terrain data on the area to which the subject vehicle 100 belongs. Alternatively, the controller 11 determines whether the subject vehicle 100 is traveling the specific area from the image data that is acquired by the imaging unit 18 and the information of the distance to the surrounding object that is acquired by the ranging unit 19, etc. The specific area may be, as described above, an area where multipath propagation tends to occur.

When the subject vehicle 100 is traveling the specific area (YES at step S104), the controller 11 sets a scan in the independent mode in the radar controller 21 (step S105) and then goes to step S108. Accordingly, the independent mode in which the whole area of the subject area is scanned according to the directionality of the receiving antenna 24 against the direction of the single directionality of the transmitting antenna 23 is executed.

On the other hand, when the subject vehicle 100 is not traveling the specific area (NO at step S104), the controller 11 determines whether the scan mode that is set in the radar controller 21 currently is the linked mode (step S106) and, when it is the linked mode (YES at step S106), goes to step S108 directly. On the other hand, when it is not the linked mode (NO at step S106), the controller 11 sets the scan mode that is set in the radar controller 21 at the linked mode (step S107) and then goes to step S108.

At step S108, the controller 11, for example, determines whether to end the operation according to a command from the vehicle control system that is not illustrated in the drawing and, when it is determined to end the operation (YES at step S108), ends the operation. On the other hand, when it is determined not to end the operation (NO at step S108), the controller 11 returns to step S102 and executes the following operations repeatedly.

1.5 Function and Effect

As described above, according to the embodiment, it is possible to switch the scan mode according to the environment information on the surroundings of the subject vehicle 100 and the subject vehicle information. This enables appropriate object detection according to the environment information on the surroundings of the subject vehicle 100, etc.

In the description above, for example, the case where, when a steep ascending slope is present ahead of the subject vehicle 100, performing a scan in the independent mode prevents malfunction in object detection by multipath propagation is exemplified; however, embodiments are not limited thereto and, for example, the directions of judiciary of the transmitting antenna 23 and the receiving antenna 24 may be changed to upward directions according to the angle of the ascending slope that is present ahead, etc.

2. Second Embodiment

A control device, a control method and a sensor control system according to a second embodiment will be described in detail next with reference to the drawings.

When a phased array antenna like that exemplified in FIG. 5 is used as illustrated in the first embodiment as the transmitting antenna 23, appropriately selecting the number of and a combination of the antenna elements 231 that are used to send out a transmission signal makes it possible to control the beam width, the beam distance, the beam direction, etc.

Figure 13:
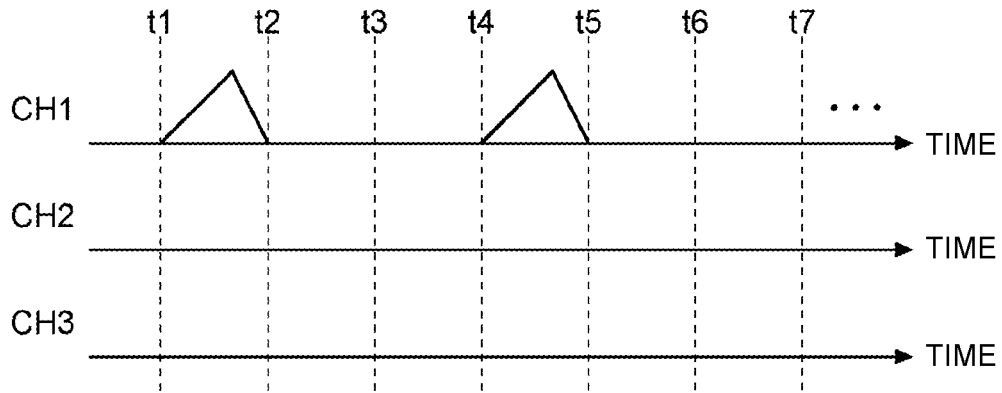
FIG. 13 is a waveform chart illustrating an example of transmission signals that are sent out of a transmitting antenna in a wide-field mode according to a second embodiment.
Figure 14:
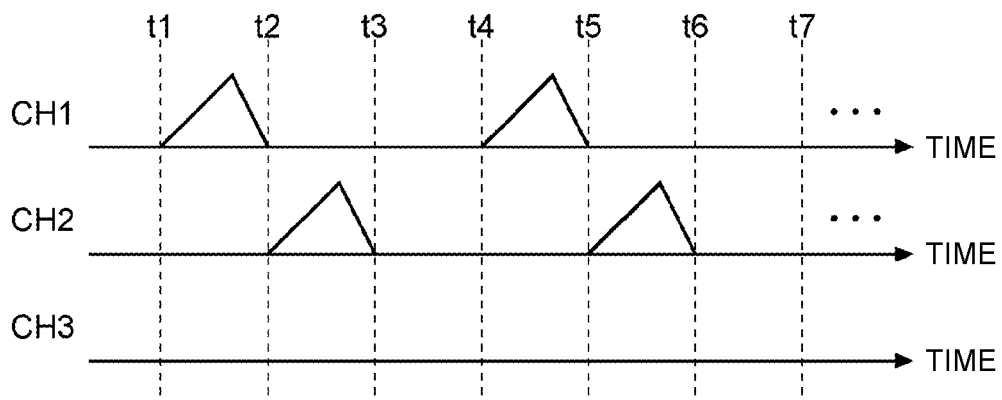
FIG. 14 is a waveform chart illustrating an example of transmission signals that are sent out of the transmitting antenna in a long-distance mode according to the second embodiment.
Figure 15:
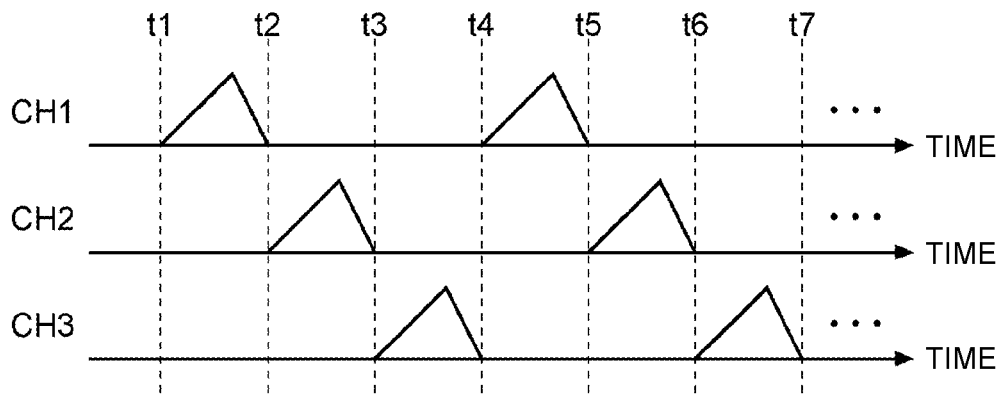
FIG. 15 is a waveform chart illustrating an example of transmission signals that are sent out of the transmitting antenna in a following mode according to the second embodiment.

The case where the transmitting antenna 23 consists of three antenna elements 231 of three channels CH1 to CH3 in total that are arrayed parallelly is assumed herein as an example. As exemplified in FIG. 13, when the single antenna element 231 of the channel CH1 out of the three antenna elements 231 is used, a transmission signal with the widest beam width is output as illustrated in a beam area AR1 in FIG. 16. As exemplified in FIG. 14, when the two antenna elements 231 of the channels CH1 an CH2 (alternatively, CH1 and CH3 or CH2 and CH3) out of the three antenna elements 231 are used, a transmission signal with a beam width narrower than a beam area AR2 is output as illustrated in the beam area AR2 in FIG. 16. Furthermore, as exemplified in FIG. 15, when all the three antenna elements 231, that is, all the channels CH1 to CH3 are used, a transmission signal with the narrowest beam width is output as illustrated in a beam area AR3 in FIG. 17.

Thus, in the embodiment, the beam width and the beam distance of a transmission signal to be sent out of the transmitting antenna 23 are switched according to the environment information on the surroundings of the subject vehicle 100 and the information on the subject vehicle 100 (referred to as subject vehicle information below). This enables appropriate object detection according to the environment information on the surroundings of the subject vehicle 100.

2.1 Rader Detection Mode

A radar detection mode in which the transmission signal with the widest beam width (the widest field) is sent out (for example, refer to the beam area AR1 in FIG. 13 and FIG. 16) is referred to as a wide-field mode, a radar detection mode in which the transmission signal with the beam width narrower than that in the wide-field mode is sent out (for example, refer to the beam area AR2 in FIG. 14 and FIG. 16) is referred to as a long-distance mode, and a radar detection mode in which the transmission signal with the narrowest beam width is sent out (for example, refer to the beam area AR3 in FIG. 15 and FIG. 17) is referred to as a following mode.

The wide-field mode with the smallest number of antenna elements 231 to be used has a characteristic in that object detection in a wide field is enabled because of the widest beam width. The mode also has an advantage in that the time required for signal processing on an echo signal is the shortest because of the smallest number of types of transmission signals to be sent out. For this reason, the wide-field mode is, for example, a mode that is effective in areas, such as residential areas and downtowns (simply referred to as downtown below), where a relatively lot of objects, such as the automobiles 921, the pedestrians 922, bicycles 923, and traffic lights 924 (refer to FIG. 16) are present.

Figure 16:
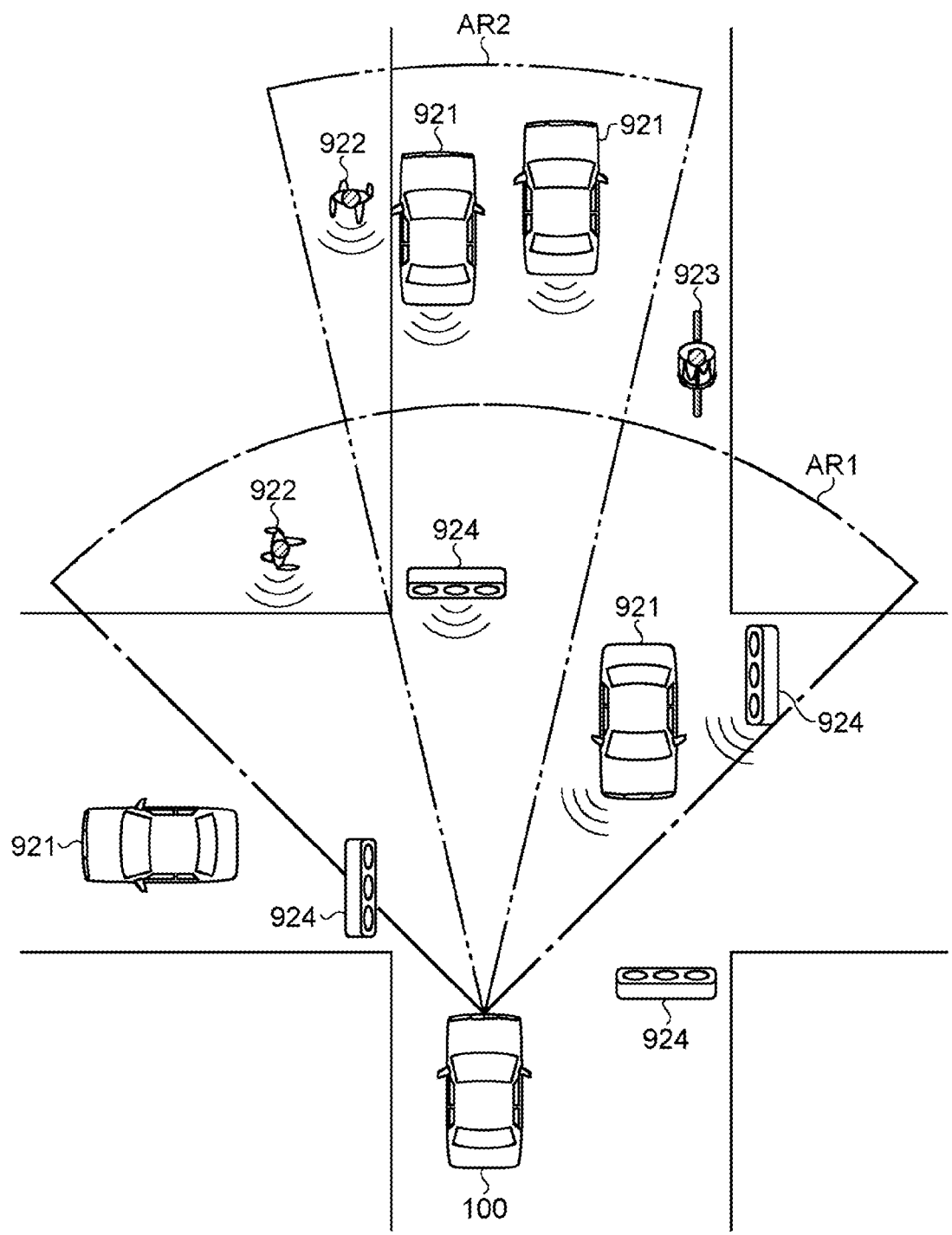
FIG. 16 is a diagram for explaining the wide-field mode and the long distance mode according to the second embodiment.
Figure 17:
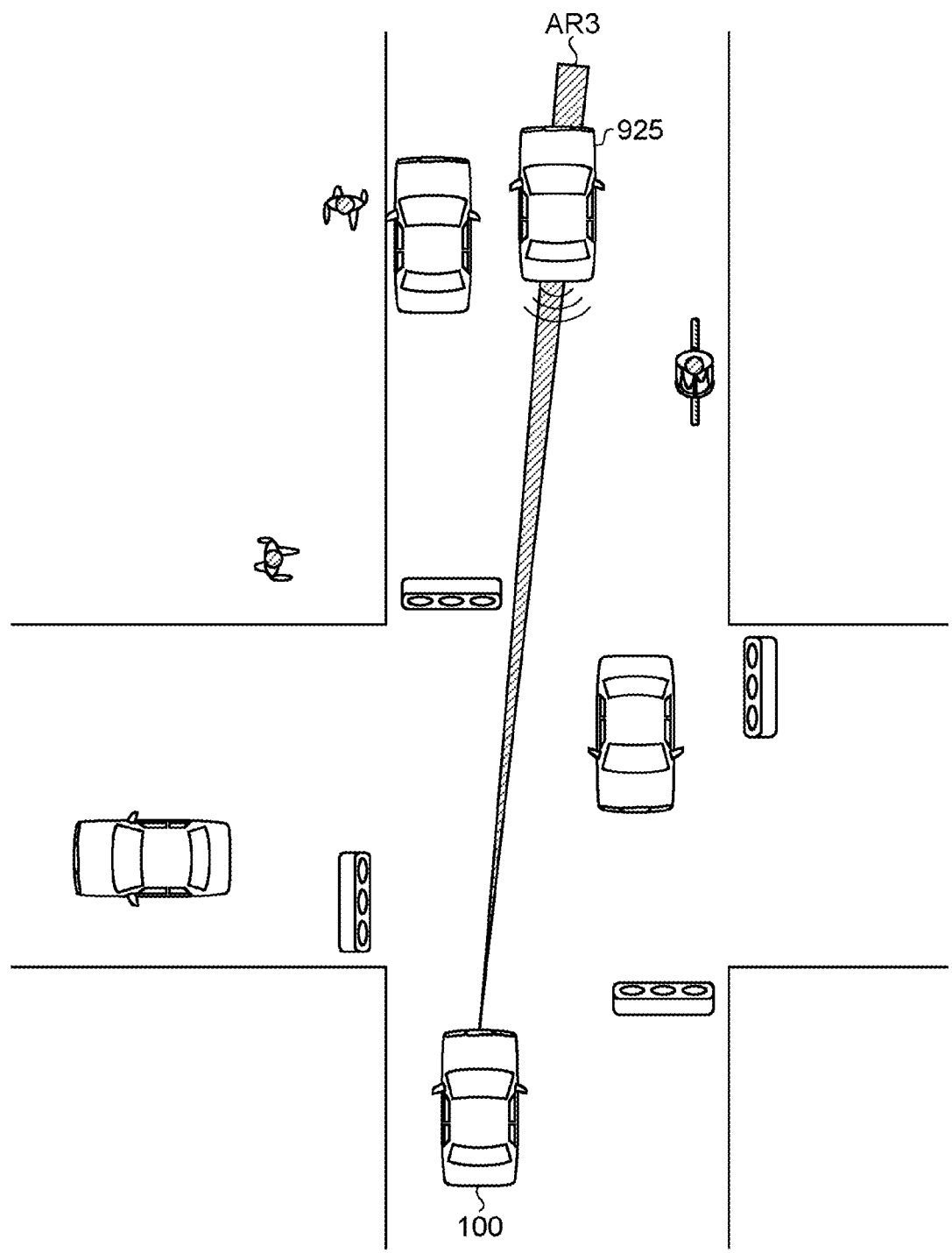
FIG. 17 is a diagram for explaining the following mode according to the second embodiment.

On the other hand, because the long-distance mode has a characteristic in that, while the beam width is narrower than that in the wide-field mode, the beam distance is longer than that in the wide-field mode, the long-distance mode is, for example, a mode that is effective in areas, such as outskirts and toll roads (including highways) (simply referred to as toll road below), where there are a relatively small number of the automobiles 921, the pedestrians 922, the bicycles 923, and the traffic lights 924 (refer to FIG. 16).

Furthermore, the following mode with the narrowest beam width, that is, with the highest directionality is, for example, usable as a mode that is executed when a cruise control function or an active cruise control function of autonomously following a preceding vehicle (for example, a preceding vehicle 925 in FIG. 17), or the like, is started.

In any one of the above-described first to third modes, all the antenna elements 241 of the receiving antenna 24 are used to receive echo signals.

2.2 Configuration

An example of a schematic configuration of a radar detection system according to the embodiment may be the same as that of the radar detection system 1 described in the first embodiment, using FIGS. 4 and 5, and thus detailed description thereof will be omitted here. Note that, in the embodiment, the controller 11 executes the operations exemplified in FIG. 18.

2.3 Operation Flow

Figure 18:
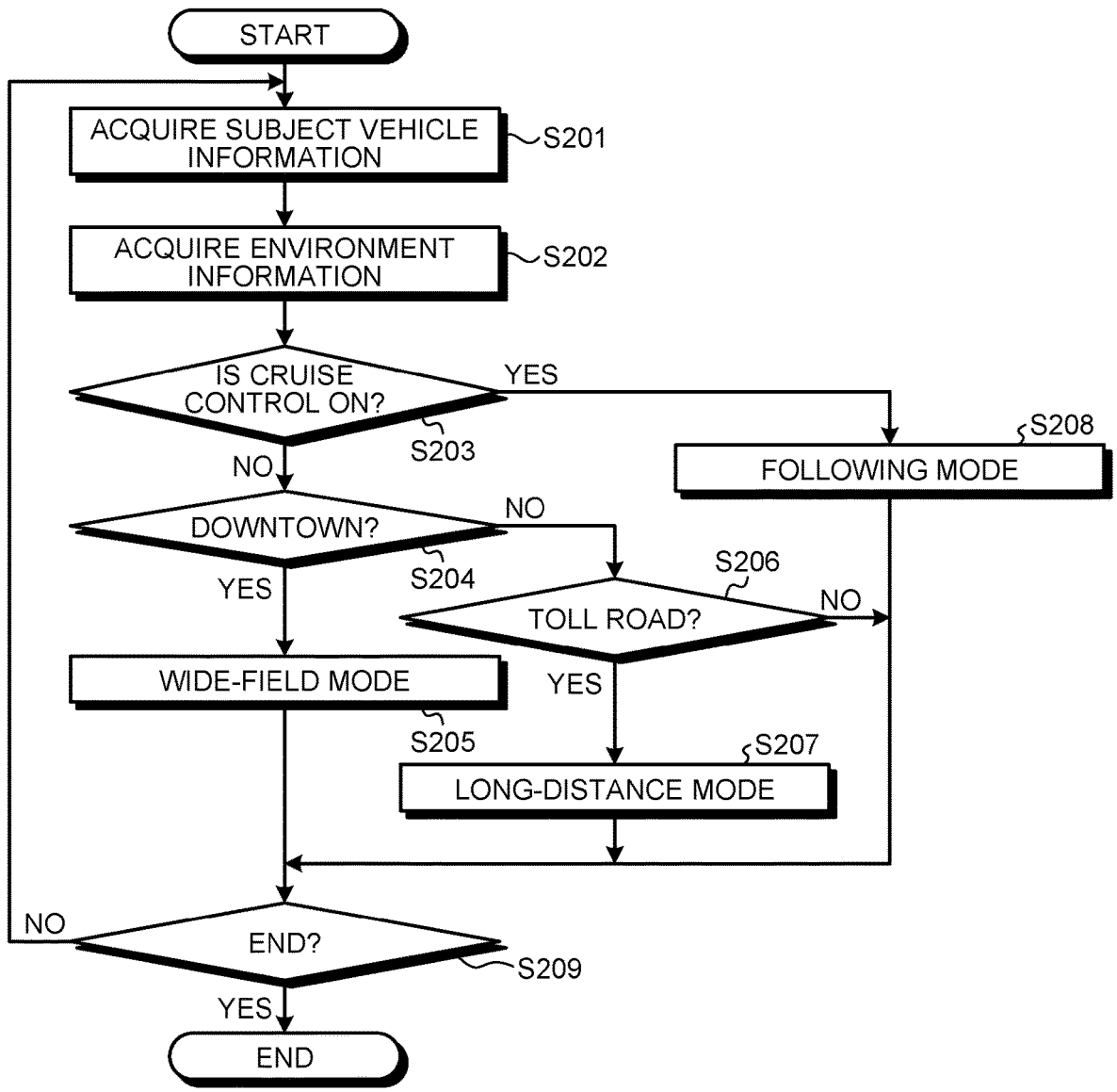
FIG. 18 is a flowchart illustrating an example of general operations of a radar detection system according to the second embodiment.

FIG. 18 is a flowchart illustrating an example of general operations of the radar detection system according to the embodiment. In the description, the case where the radar detection mode is switched between a downtown and a toll road is exemplified. In the following description, operations of the controller 11 are focused on and described.

The operations illustrated in FIG. 18 are, for example, started when ignition is cased in the engine of the subject vehicle 100 or when the shift lever is put in the drive range. As illustrated in FIG. 18, in the operations, first of all, as at step S102 and step S103 in FIG. 12, the controller 11 acquires subject vehicle information on the subject vehicle 100 from the subject vehicle information acquisition unit 12 (step S201) and acquires environment information on the surroundings of the subject vehicle 100 (step S202).

The controller 11, for example, determines whether cruise control (or active cruise control) is set ON by a setting made by the driver (step S203) and, when it is set ON (YES at step S203), goes to step S208. On the other hand, when cruise control, or the like, is OFF (NO at step S203), the controller 11 goes to step S204.

At step S204, the controller 11 determines whether the subject vehicle 100 is traveling a downtown currently from the environment information and the subject vehicle information as at step S104 in FIG. 12. When the subject vehicle 100 is traveling a downtown (YES at step S204), the controller 11 causes the radar device 20 to execute beam sending in the wide-field mode that enables object detection in a wide field (for example, refer to the radar area AR1 in FIG. 13 and FIG. 16) (step S205) and then goes to step S209.

On the other hand, when the subject vehicle is not traveling a downtown (NO at step S204), the controller 11, for example, determines whether the subject vehicle 100 is traveling a toll road, such as a highway, (or countryside) from the environment information and the subject vehicle information as at step S104 in FIG. 12 (step S206). When the subject vehicle 100 is traveling a toll road, or the like (YES at step S206), the controller 11 causes the radar device 20 to execute beam sending in the long-distance mode that enables detection of a farther object (for example, refer to the radar area AR2 in FIG. 14 and FIG. 16) (step S207) and then goes to step S209.

At step S208, the controller 11 causes the radar device 20 to execute beam sending in the following mode of following the specific preceding vehicle 925 traveling ahead (for example, refer to the radar area AR3 in FIG. 15 and FIG. 17) and then goes to step S209.

At step S209, the controller 11, for example, determines whether to end the operation according to a command from the vehicle control system not illustrated in the drawing and, when it is determined to end the operation (YES at step S209), ends the operation. On the other hand, when it is determined not to end the operation (NO at step S209), the controller 11 returns to step S201 and repeatedly executes the following operations.

2.4 Function and Effect

As described above, according to the embodiment, it is possible to switch the beam width and the beam distance of the transmission signal that is sent out of the transmitting antenna 23 according to the environment information on the surroundings of the subject vehicle 100 and the subject vehicle information. This enables appropriate object detection according to the environment information on the surroundings of the subject vehicle 100, etc.

In the above description, the case where, even when there are the antenna elements 231 of channels that are not used, the cycle in which a transmission signal is sent out of the antenna element 231 of the channel that is used is not changed is exemplified. For example, in the example illustrated in FIG. 13, the case where, in slots that is assigned to the antenna elements 231 of the channels CH2 and CH3 that are not used, no transmission signal is sent out of the antenna element 231 of the channel CH1 that is used is exemplified and, in the example illustrated in FIG. 14, the case where, in slots that are assigned to the antenna element 231 of the channel CH3 that is not used, no transmission signal is sent out of the antenna elements 231 of the channel CH1 or CH2 that is used is exemplified. Note that embodiments are not limited to such operations.

Figure 19:
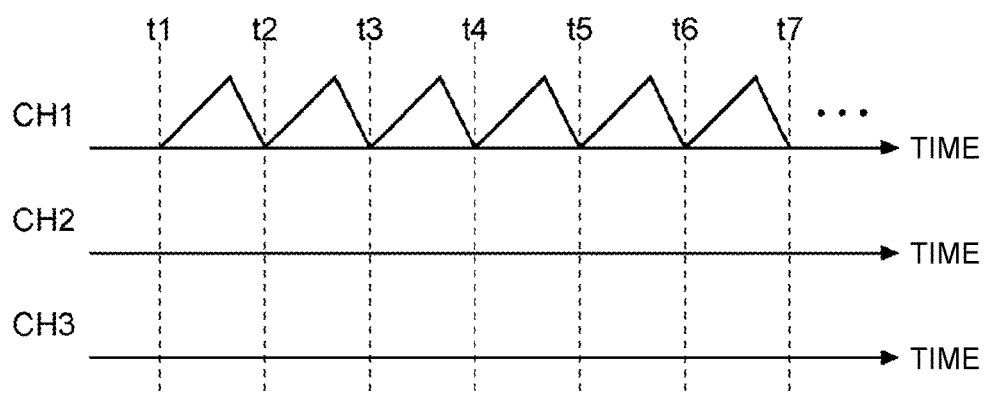
FIG. 19 is a waveform chart illustrating another example of the transmission signals that are sent out of the transmitting antenna in the wide-field mode according to the second embodiment.
Figure 20:
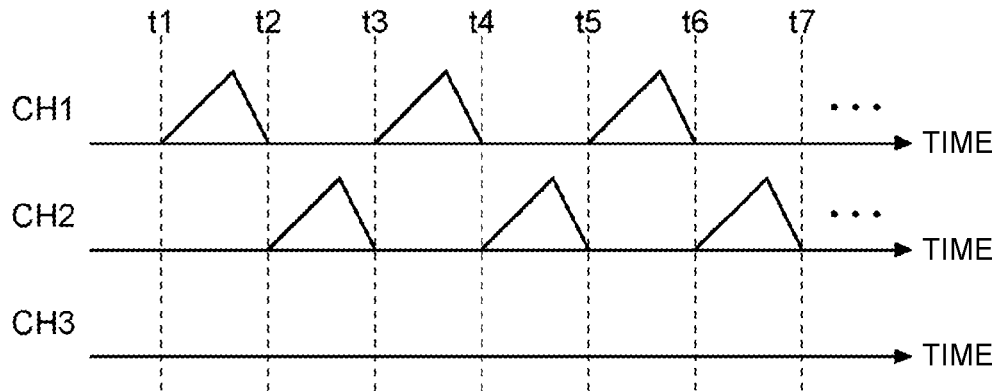
FIG. 20 is a waveform chart illustrating another example of the transmission signals that are sent out of the transmitting antenna in the long distance mode according to the second embodiment.

For example, as illustrated in FIG. 11, it can be configured to send out a transmission signal in every cycle from the antenna element 231 of the channel CH1 that is used in the wide-field mode. Similarly, as illustrated in FIG. 20, it may be configured to send out transmission signals alternately from the antenna elements 231 of the channels CH1 and CH2 that are used in the long-distance mode. In other words, it is possible to cause the antenna element 231 that is used to send out a transmission signal so as not to cause a free cycle in which no transmission signal is sent out because part of the antenna elements 231 are not used. This makes it possible to increase the rate of detection of an object that is present around the subject vehicle 100. For example, in the example illustrated in FIG. 19, it is possible to achieve a detection rate that is substantially three times larger than that in the example illustrated in FIG. 13. In the example illustrated in FIG. 20, it is possible to achieve a detection rate that is substantially 1.5 times larger than that in the example illustrated in FIG. 14.

Figure 21:
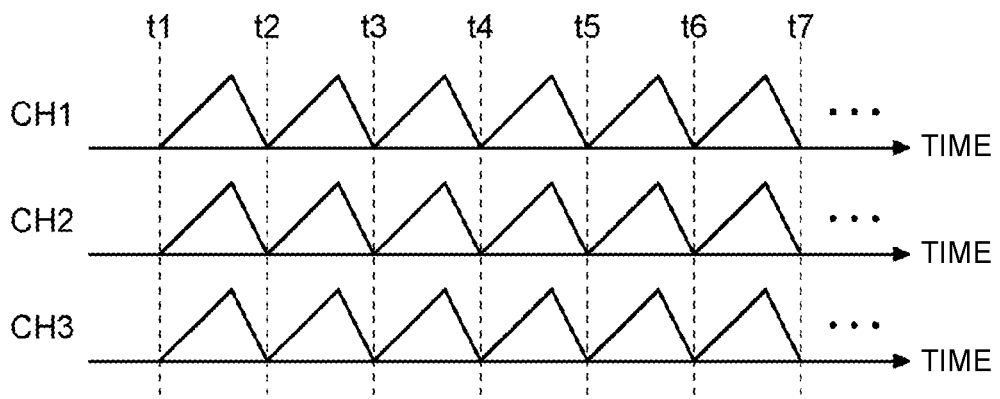
FIG. 21 is a waveform chart illustrating another example of the transmission signals that are sent out of the transmitting antenna in the following mode according to the second embodiment.

In the above description, the case where transmission signals are not sent out of multiple antenna elements 231 simultaneously is exemplified; however, embodiments are not limited thereto. For example, as illustrated in FIG. 21, it can be configured to send out transmission signals from at least two antenna elements 231 in the same cycle. In this case, the frequency bands of the transmission signals that are sent out of the antenna elements 231 that are driven in the same cycle may differ from one another or the same. When the frequency bands differ, it is possible to improve the detection rate while achieving high directionality. On the other hand, when the frequency bands are the same, it is possible to improve the detection rate while increasing the beam distance. Note that the case of the following mode is exemplified in FIG. 21; however, embodiments are not limited thereto and it is applicable to the long-distance mode, etc.

The remaining configuration, operations and effects may be the same as those of the above-described embodiments and thus detailed description thereof is omitted here.

3. Third Embodiment

A control device, a control method and a sensor control system according to a third embodiment will be described in detail next with reference to the drawings.

For example, in the radar detection systems 1 according to the above-described embodiments, widening the frequency band of the transmission signal to be sent out of the antenna element 231 makes it possible to increase the resolution of object detection (resolution in the width direction of the object 30 viewed from the subject vehicle 100, which is referred to as width resolution power below).

3.1 Frequency and Width Resolution

Figure 22:
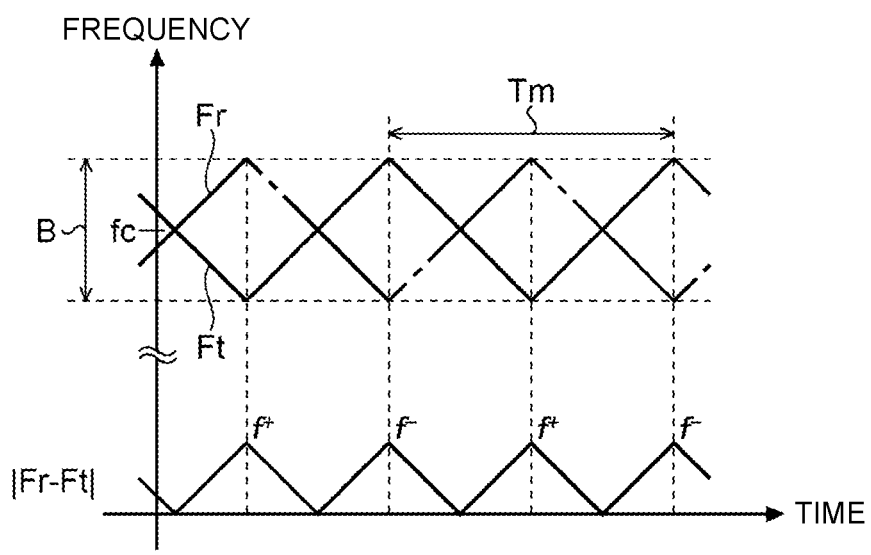
FIG. 22 is a diagram illustrating changes in frequency of a transmission signal that is sent out of the transmitting antenna in the first to third embodiments.

FIG. 22 is a diagram illustrating changes in frequency of a transmission signal that is sent out of the transmitting antenna in the above-described embodiments or the present embodiment. The transmission signal is, as described above, obtained because a local signal that is generated by the local oscillator of the radar transmission processor 22 by causing oscillation based on a chirp signal from the radar controller 21 is amplified by the power amplifier of the same radar transmission processor 22 and is then sent out of the transmitting antenna 23.

As illustrated in FIG. 22, a frequency Ft of the transmission signal changes, oscillating in a frequency band having a bandwidth B with a center frequency fc serving as the center in a given period Tm. When the transmission signal chirped as described above is used as a beam for object detection, a width R of the object 30 that is detected can be calculated by Equation (1) below. In FIG. 22 and the following Equation, Fr denotes a frequency of an echo signal that is received by the receiving antenna 24, $f^+$ and $f^-$ denote absolute values (|Fr-Ft|) of the difference between the frequency Ft of the transmission signal and the frequency Fr of the echo signal, and c denotes a velocity of light.

$$R = \frac{c(f^- + f^+)Tm}{8B} \quad (1)$$

In Equation (1), when $f^+$ and $f^-$ are at maximum (=bandwidth B), the width R of the detected object is at maximum and thus the maximum width R that is detectable in the bandwidth B (referred to as maximum detection width $R_{max}$ below) can be calculated as by Equation (2) below.

$$R_{max} = \frac{c \cdot Tm}{4} \quad (2)$$

From Equation (1), a width resolution power ΔR can be calculated as by Equation (3) below.

$$\Delta R = \frac{c}{2B} \quad (3)$$

Figure 23:
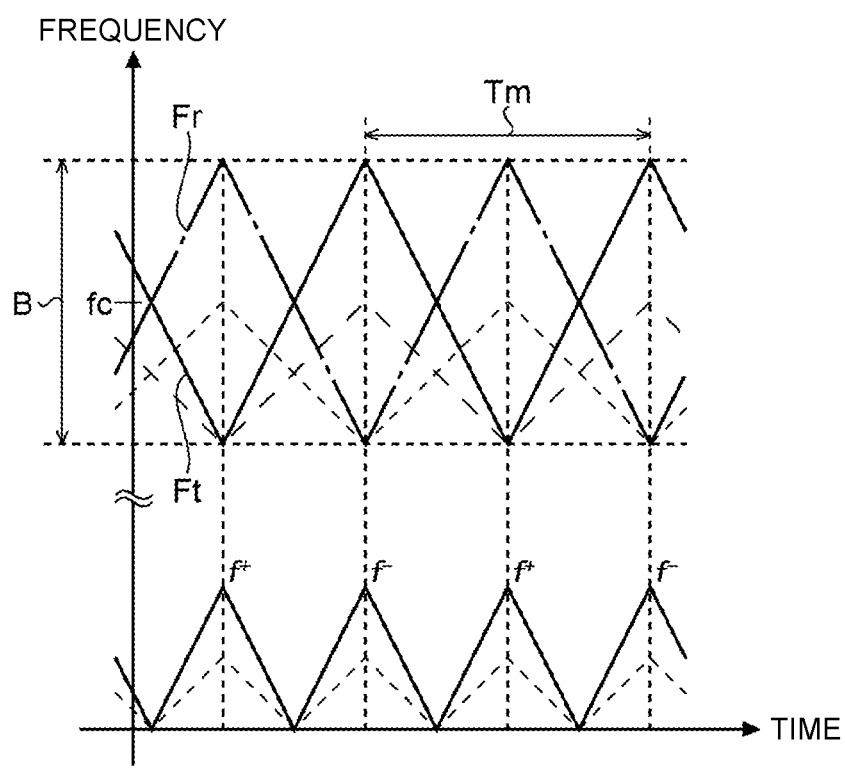
FIG. 23 is a diagram illustrating changes in frequency of a transmission signal that is sent out of the transmitting antenna in the third embodiments.

Thus, from Equation (3), for example, it is represented that, as illustrated in FIG. 23, widening the bandwidth B of the transmission signal makes it possible to increase the resolution (width resolution power) in object detection.

Note that widening the bandwidth B has a risk of leading to complication of radar chip control and increase in the amount of signal processing and increase in power consumption associated therewith. Thus, in the embodiment, the bandwidth B is changed according to the circumstances of the subject vehicle 100 and the surroundings of the subject vehicle 100. For example, in an area where there can be objects that are difficult to detect with a millimeter-wave radar, such as a residence area in which a lot of relatively small objects like the pedestrians 922 and road signs can be present or a downtown with a lot of objects that should be detected (referred to as downtown below), failures in detection are reduced by increasing the width resolution power by widening the bandwidth B of the transmission signal and, in an area where the circumstances under which an object cannot be detected with a millimeter-wave radar tend not to occur, such as outskirts or a toll road, the detection rate is improved and the power consumption is reduced by narrowing the bandwidth B of the transmission signal.

3.2 Configuration

An example of a schematic configuration of a radar detection system according to the embodiment may be the same as that of the radar detection system 1 described in the first embodiment, using FIGS. 4 and 5, and thus detailed description will be omitted here. Note that, in the embodiment, the controller 11 executes the operations exemplified in FIG. 24.

3.3 Operation Flow

Figure 24:
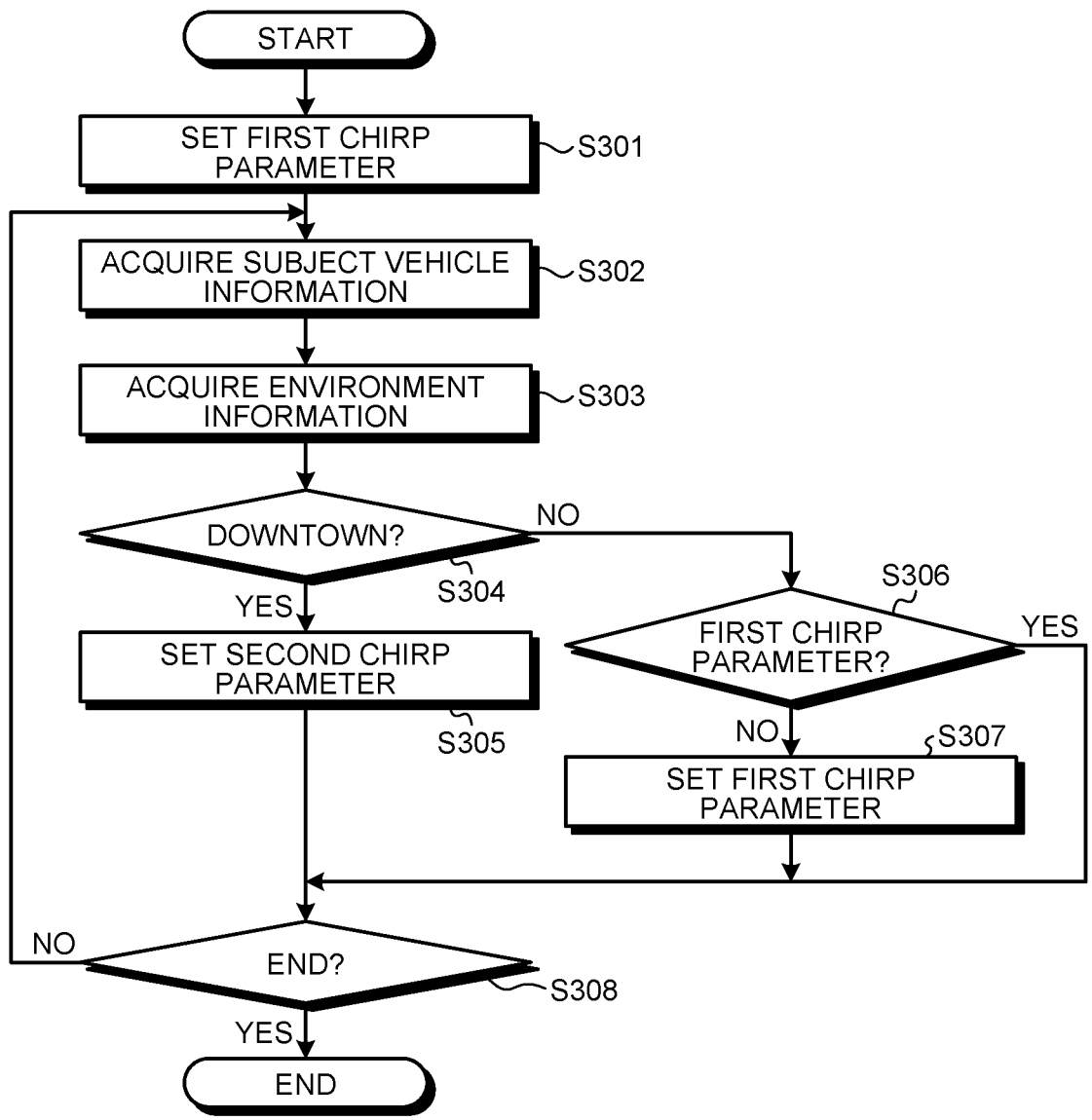
FIG. 24 is a flowchart illustrating an example of general operations of a radar detection system according to the third embodiment.

FIG. 24 is a flowchart illustrating an example of general operations of the radar detection system according to the embodiment. In the description, the case where the bandwidth of a local signal that the radar controller 21 causes the local oscillator of the radar transmission processor 22 to generate is changed between downtowns and areas other than downtowns is exemplified. In the following description, operations of the controller 11 are focused on and described. Furthermore, in the description, a parameter (referred to as a chirp parameter below) for generating a chirp control signal for causing the local oscillator to generate a local signal with a general bandwidth (first bandwidth below) B like that exemplified in FIG. 22 is referred to as a first chirp parameter and a chirp parameter for generating a chirp control signal for causing the local oscillator to generate a local signal with a bandwidth (second bandwidth below) B wider than the first bandwidth is referred to as a second chirp parameter.

The operations illustrated in FIG. 24 are, for example, started when ignition is cased in the engine of the subject vehicle 100 or when the shift lever is put in the drive range. As illustrated in FIG. 24, in the operations, first of all, after the start, the controller 11 sets the first chirp parameter in the radar controller 21 (step S301). Accordingly, right after the start, a chirp control signal for generating a local signal with the first bandwidth is input from the radar controller 21 to the radar transmission processor 22. Accordingly, the bandwidth B of the transmission signal that is sent out of the transmitting antenna 23 is the first bandwidth.

For example, as at step S102 and S103, the controller 11 then acquires subject vehicle information on the subject vehicle 100 from the subject vehicle information acquisition unit 12 (step S302) and acquires environment information on the surroundings of the subject vehicle 100 (step S303).

The controller 11 then, for example, as at step S104 in FIG. 12, determines whether the subject vehicle 100 is traveling a downtown currently from environment information and subject vehicle information (step S304). When the subject vehicle 100 is traveling a downtown (YES at step S304), the controller 11 sets the chirp parameter that is set in the radar controller 21 at the second chirp parameter (step S305) and then goes to step S308. Accordingly, a chirp control signal for generating the local signal with the second bandwidth is input from the radar controller 21 to the radar transmission processor 22. As a result, the bandwidth B of the transmission signal that is sent out of the transmitting antenna 23 is the second bandwidth.

On the other hand, when the subject vehicle 100 is not traveling a downtown (NO at step S304), the controller 11 determines whether the chirp parameter that is set currently in the radar controller 21 is the first chirp parameter (step S306) and, when it is the first chirp parameter (YES at step S306), goes to step S308 directly. On the other hand, when it is not the first chirp parameter (NO at step S306), the controller 11 sets the chirp parameter that is set in the radar controller 21 at the first chirp parameter (step S307) and then goes to step S308. Accordingly, the chirp control signal for generating the local signal with the first bandwidth is input from the radar controller 21 to the radar transmission processor 22 and, as a result, the bandwidth B of the transmission signal that is sent out of the transmitting antenna 23 is the first bandwidth.

At step S308, the controller 11, for example, determines whether to end the operation according to a command from the vehicle control system not illustrated in the drawing and, when it is determined to end the operation (YES at step S308), ends the operation and, when it is determined not to end the operation (NO at step S308), the controller 11 returns to step S302 and repeatedly executes the following operations.

3.4 Function and Effect

As described above, according to the embodiment, it is possible to switch the bandwidth B of the transmission signal to be sent out of the transmitting antenna 23 according to the environment information on the surroundings of the subject vehicle 100 and the subject vehicle information. This enables appropriate object detection according to the environment information on the surroundings of the subject vehicle 100, etc.

Operations exemplified in FIG. 24, for example, can be combined with the operations that are described in the first embodiment, using FIG. 12, and/or the operations that are described in the second embodiment, using FIG. 18. For example, when the subject vehicle 100 is traveling a downtown, or the like, it is possible to cause the radar device 20 to execute object detection in the wide-field mode and operate to extend the bandwidth B of the local signal that is generated by the local oscillator of the radar transmission processor 22.

The remaining configuration, operations and effects may be the same as those of the above-described embodiments and thus detailed description thereof is omitted here.

4. Fourth Embodiment

A control device, a control method, and a sensor control system according to a fourth embodiment will be described in detail with reference to the drawings.

As described above, using FIG. 3, when a relatively small object, such as the pedestrian 922, and a relatively large object, such as the automobile 921, are present in the beam area AR, the signal intensity (radio wave intensity) of the echo signal 122 obtained because a transmission signal is reflected on the pedestrian 922 and comes back is a significantly small value compared to the signal intensity (radio wave intensity) of the echo signal 121 obtained because a transmission signal is reflected on the automobile 921 and comes back. For this reason, for example, when a threshold Th1 for removing noise from the echo signal that is received by the receiving antenna 24 is set in the radar reception processor 26 as exemplified in FIG. 25, detection of the pedestrian 922 causing a small signal intensity may fail.

Figure 25:
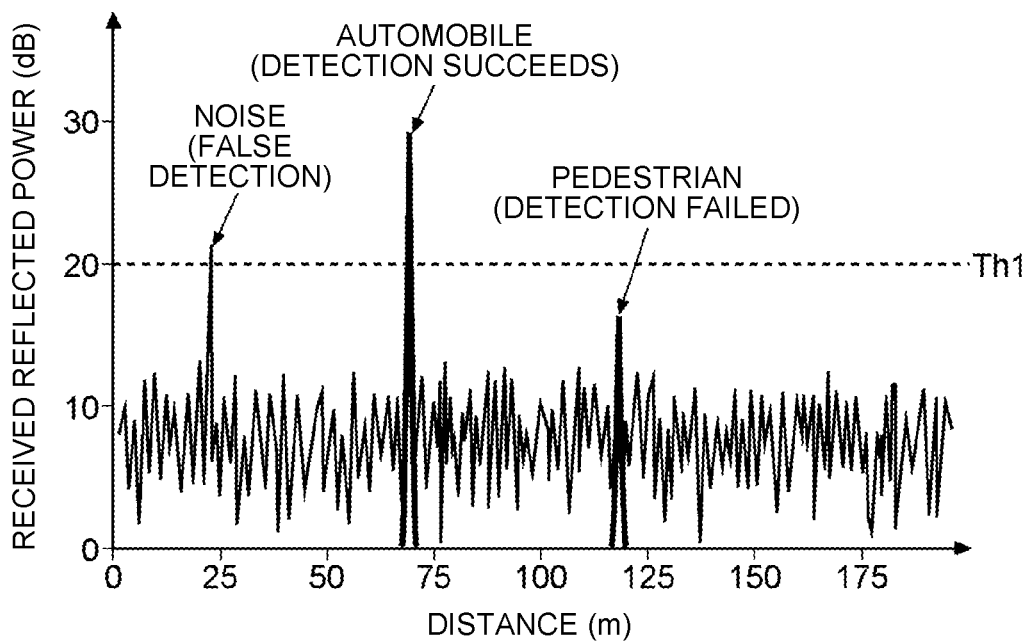
FIG. 25 is a diagram for explaining the intensity of a signal that is received by a receiving antenna in the case where a pedestrian and an automobile are present in a beam area.

On the other hand, when the threshold Th1 is set low, as exemplified in FIG. 25, noise may not be removed in the radar reception processor 26 and false detection may occur.

In general, noise to be received by the receiving antenna 24 occurs more in downtowns, or the like, where a lot of structures, such as buildings, that reflect radio waves are present than in areas, such as outskirts, with fewer buildings. On the other hand, objects, such as pedestrians, that reduce the signal intensity of echo signals are less likely to be present in areas, such as toll roads (including highways), where entry of pedestrians is restricted.

Thus, in the embodiment, the threshold of echo signals is changed according to the circumstances of the subject vehicle 100 and the circumstances around the subject vehicle 100. For example, the threshold is lowered to reduce detection failures in areas, such as downtowns where a lot of relatively small objects like the pedestrians 922 and road signs can be present, and the threshold is increased to reduce false detection in areas, such as toll roads (including highways), in which objects that reduce the signal intensity of echo signals are less likely to be present.

4.1 Configuration

An example of a schematic configuration of a radar detection system according to the embodiment may be the same as the radar detection system 1 described in the first embodiment, using FIGS. 4 and 5, and thus detailed description will be omitted. Note that, in the embodiment, the controller 11 executes the operations exemplified in FIG. 26.

4.2 Operation Flow

Figure 26:
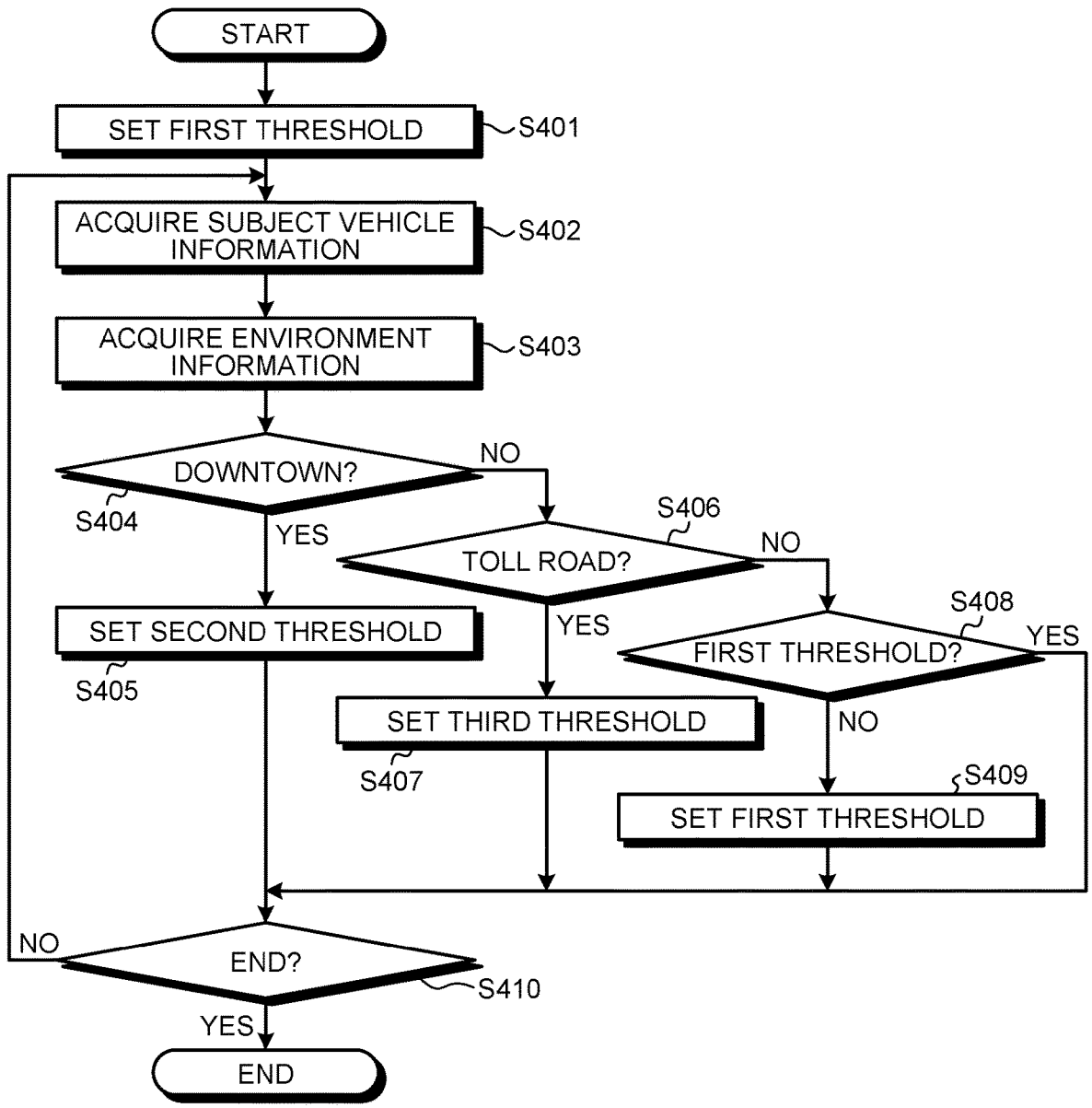
FIG. 26 is a flowchart illustrating an example of general operations of a radar detection system according to a fourth embodiment.

FIG. 26 is a flowchart illustrating an example of general operations of the radar detection system according to the embodiment. In the description, the case where the threshold of echo signals that are received by the receiving antenna 24 is changed between downtowns and areas other than downtowns is exemplified. In the following description, operations of the controller 11 are focused on and described. Furthermore, in the description, a normal threshold Th1 that is set for echo signals like that exemplified in FIG. 25 is referred to as a first threshold, a threshold that is set lower than the first threshold Th1 for detecting objects, such as pedestrians, that reduce the signal intensity of echo signals without fail is referred to as a second threshold, and a threshold that is set higher than the first threshold Th1 for removing noise is referred to as a third threshold Th3.

The operations illustrated in FIG. 26 are, for example, started when ignition is cased in the engine of the subject vehicle 100 or when the shift lever is put in the drive range. As illustrated in FIG. 26, in the operations, first of all, after the start, the controller 11 issues an instruction to the radar controller 21, thereby setting the first threshold in the radar reception processor 26 (step S401).

For example, as at steps S102 and S103, the controller 11 acquires subject vehicle information on the subject vehicle 100 from the subject vehicle information acquisition unit 12 (step S402) and acquires environment information on the surroundings of the subject vehicle 100 (step S403).

Figure 27:
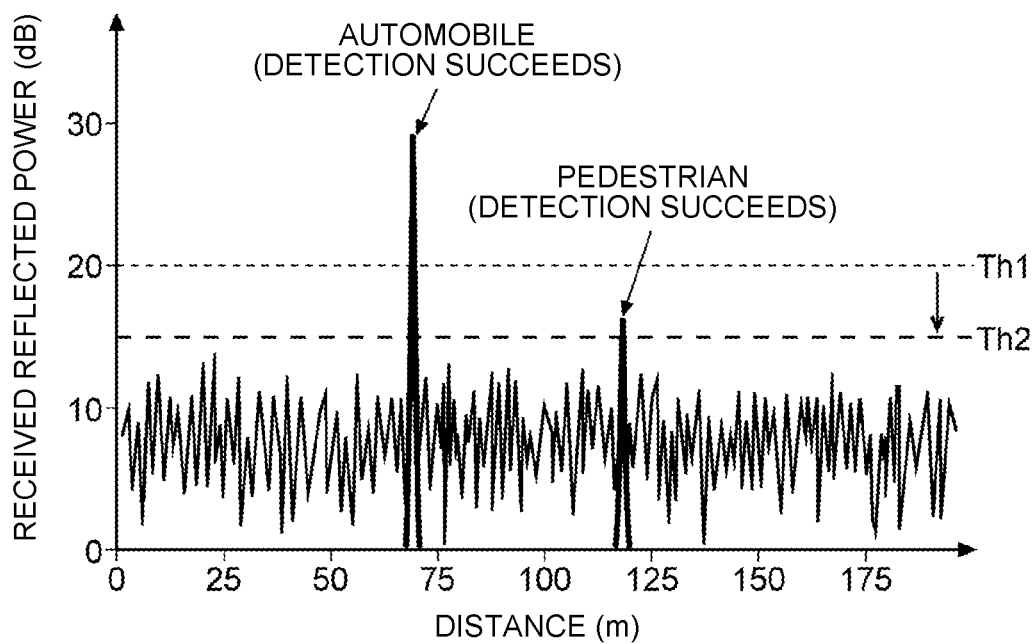
FIG. 27 is a diagram for explaining object detection in the case where a threshold of noise removal is lowered in the fourth embodiment.

The controller 11 then, for example, as at step S104 in FIG. 12, determines whether the subject vehicle 100 is traveling a downtown currently from environment information and subject vehicle information (step S404). When the subject vehicle 100 is traveling a downtown (YES at step S404), the controller 11 sets the threshold that is set in the radar reception processor 26 at the second threshold Th2 by issuing an instruction to the radar controller 21 (step S405) and then goes to step S410. Accordingly, as illustrated in FIG. 27, it is possible to succeed in detecting an object, such as a pedestrian, that reduces the signal intensity of the echo signal.

Figure 28:
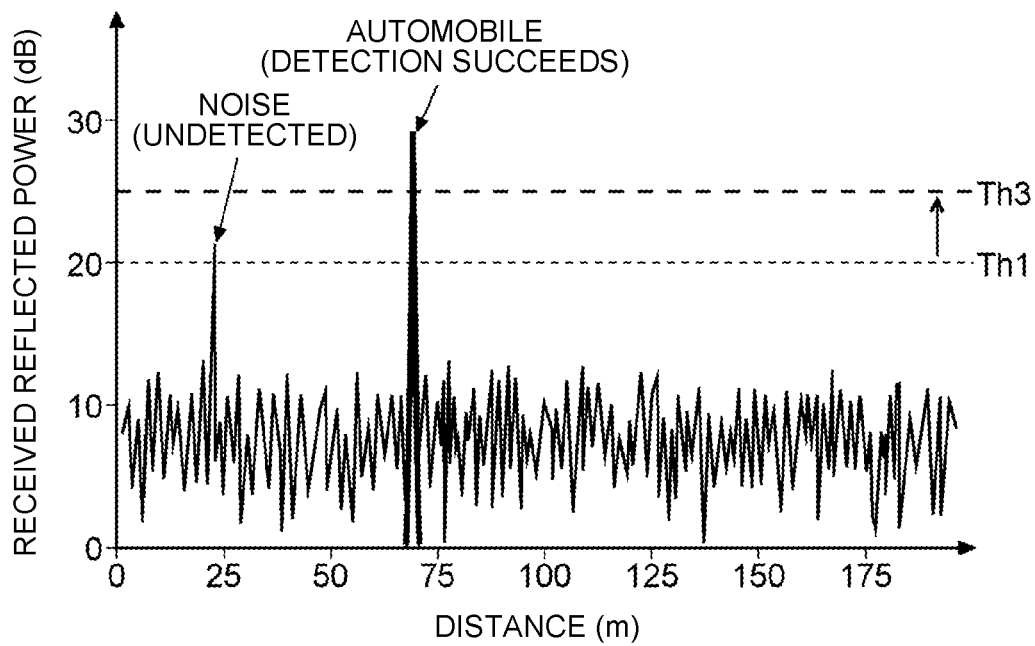
FIG. 28 is a diagram for explaining object detection in the case where a threshold of noise removal is increased in the fourth embodiment.

On the other hand, when the subject vehicle 100 is not traveling a downtown (NO at step S404), as at step S104 in FIG. 12, the controller 11 determines whether the subject vehicle 100 is traveling a toll road currently from the environment information and the subject vehicle information (step S406). When the subject vehicle 100 is traveling a toll road (YES at step S406), the controller 11 sets the threshold that is set in the radar reception processor 26 at the third threshold Th3 by issuing an instruction to the radar controller 21 (step S407) and then goes to step S401. Accordingly, as illustrated in FIG. 28, it is possible to reduce occurrence of false detection due to noise.

When the subject vehicle 100 is traveling an area that is neither a downtown nor a toll road (NO at step S406), the controller 11 determines whether the threshold that is set currently in the radar reception processor 26 is the first threshold (step S408) and, when it is the first threshold (YES at step S408), goes to step S410 directly. On the other hand, when it is not the first threshold (NO at step S408), the controller 11 sets the threshold that is set in the radar reception processor 26 at the first threshold by issuing an instruction to the radar controller 21 (step S409) and then goes to step S410.

At step S410, the controller 11, for example, determines whether to end the operation according to a command from the vehicle control system not illustrated in the drawing and, when it is determined to end the operation (YES at step S410), ends the operation. On the other hand, when it is determined not to end the operation (NO at step S410), the controller 11 returns to step S402 and repeatedly executes the following operation.

4.3 Function and Effect

As described above, according to the embodiment, it is possible to switch the threshold of echo signals according to the environment information on the surroundings of the subject vehicle 100 and the subject vehicle information. This enables appropriate object detection according to the environment information on the surroundings of the subject vehicle 100, etc.

Operations exemplified in FIG. 26 can be, for example, combined with the operations that are described in the first embodiment, using FIG. 12, the operations that are described in the second embodiment, using FIG. 18, and/or the operations that are described in the third embodiment, using FIG. 24. For example, it is possible to operate such that, while the radar device 20 is caused to execute object detection in the wide-field mode and the threshold in the radar reception processor 26 is lowered when the subject vehicle 100 is traveling a downtown, or the like, the radar device 20 is caused to execute object detection in the long-distance mode and the threshold in the radar reception processor 26 is increased when the subject vehicle 100 is traveling a toll road, or the like.

The remaining configuration, operations and effects may be the same as those of the above-described embodiments and thus detailed description thereof is omitted here.

5. Application Example

The technique according to the disclosure is applicable to various products. For example, the technique according to the disclosure may be implemented as a device that is installed in any one type of mobile object, such as an automobile, an electric vehicle, a hybrid electric vehicle, a motorcycle, a bicycle, a personal mobility, an airplane, a drone, a ship, a robot, a construction machine, or an agricultural machine (tractor).

Figure 29:
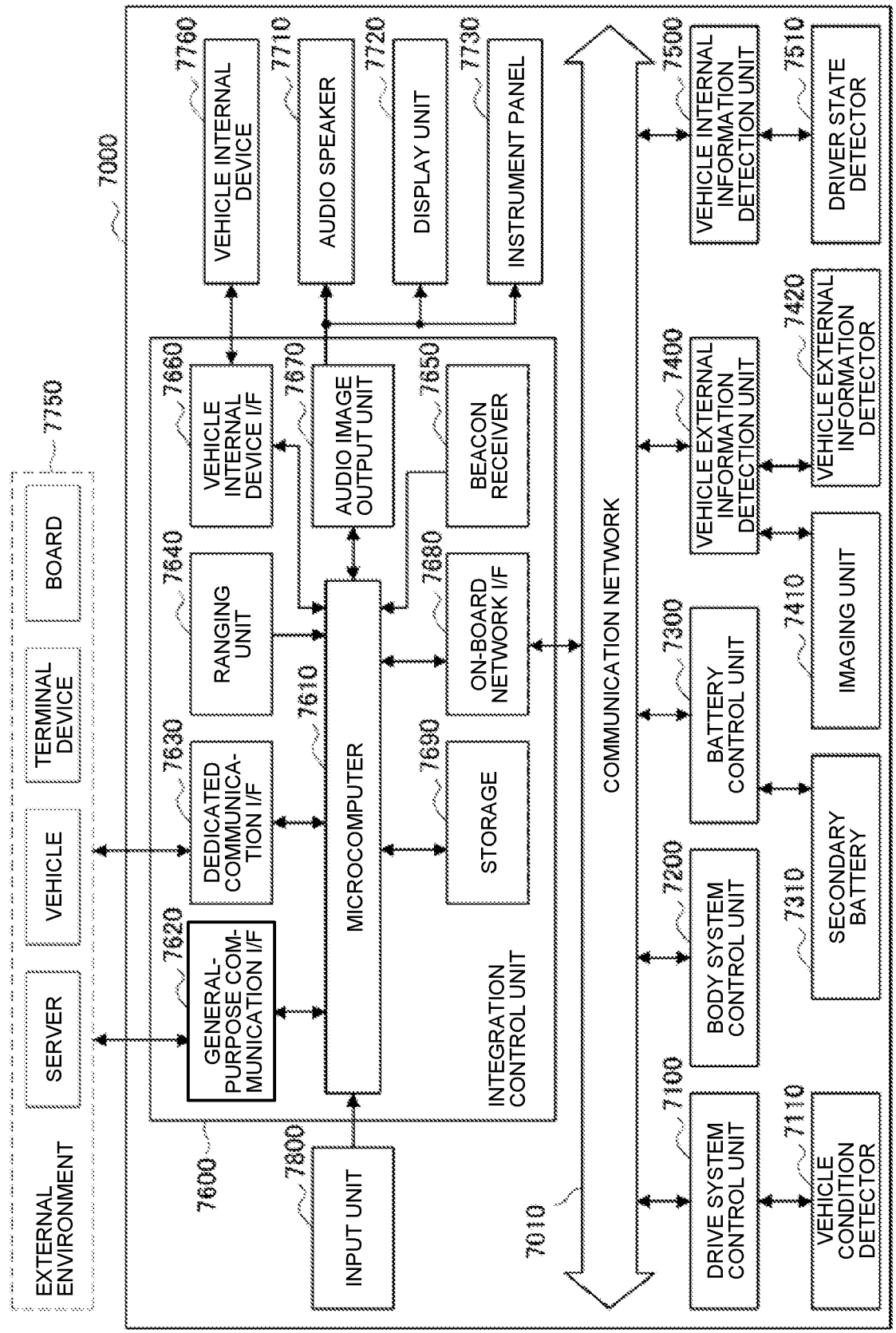
FIG. 29 is a block diagram illustrating an example of a schematic configuration of a vehicle control system.

FIG. 29 is a block diagram illustrating an example of a schematic configuration of a vehicle control system 7000 that is an example of a mobile object control system to which the technique according to the disclosure is applicable. The vehicle control system 7000 includes a plurality of electronic control units that are connected via a communication network 7010. In the example illustrated in FIG. 29, the vehicle control system 7000 includes a drive system control unit 7100, a body system control unit 7200, a battery control unit 7300, a vehicle external information detection unit 7400, a vehicle internal information detection unit 7500, and an integration control unit 7600. The communication network 7010 that connects the control units to one another, for example, may be an on-board communication network according to given standards, such as CAN (Control Area Network), LIN (Local Interconnect Network), LAN (Local Area Network) or FlexRay (trademark).

Each of the control units includes a microcomputer that performs arithmetic operations according to various programs, a storage that stores the programs that are executed by the microcomputer, parameters that are used for various arithmetic operations, or the like, and a drive circuit that drives a device on which various types of control are to be performed. Each of the control units includes a network I/F for performing communication with another control unit via the communication network 7010 and includes a communication I/F for performing communication by wired communication or wireless communication with a device or a sensor in or outside the vehicle. In FIG. 29, a microcomputer 7610, a general-purpose communication I/F 7620, a dedicated communication I/F 7630, a positioning unit 7640, a beacon receiver 7650, a vehicle internal device I/F 7660, an audio image output unit 7670, an on-board network I/F 7680, the audio image output unit 7670, an on-board network I/F 7680 and a storage 7690 are illustrated as the functional configuration of the integration control unit 7600. Similarly, other control units include microcomputers, communication I/Fs, and storages.

The drive system control unit 7100 controls operations of devices that relate to a drive system of the vehicle according to various programs. For example, the drive system control unit 7100 functions as a control device for a drive force generation device for generating a drive force of the vehicle, such as an engine or a drive motor, a drive force transmission mechanism for transmitting a drive force to wheels, a steering mechanism that adjusts the rudder angle of the vehicle, a braking device that generates a braking force of the vehicle, etc. The drive system control unit 7100 may have a function serving as a control device, such as an ABS (Antilock Brake System) or ESC (Electronic Stability Control).

A vehicle condition detector 7110 is connected to the drive system control unit 7100. The vehicle condition detector 7110, for example, includes at least any one of a gyro sensor that detects an angular velocity of axial rotation motion of a vehicle body, an acceleration sensor that detects acceleration of the vehicle, and sensors for detecting an amount by which the acceleration pedal is operated, an amount by which the brake pedal is operated, an angle of steering by a steering wheel, an engine rotation speed, a rotation speed of wheels, etc. The drive system control unit 7100 performs arithmetic operations, using a signal that is input from the vehicle condition detector 7110, and controls the engine, the drive motor, an electric power steering device, the brake device, etc.

The body system control unit 7200 controls operations of various devices with which the vehicle body is equipped according to various programs. For example, the body system control unit 7200 functions as a control device for a keyless entry system, a smart key system, a power window device or various lamps, such as head lamps, rear lamps, brake lamps, indicators or fog lamps. In this case, radio waves that are emitted from a portable device that substitutes a key or signals of various switches can be input to the body system control unit 7200. The body system control unit 7200 receives input of these radio waves or signals and controls a door lock device, the power window device, the lamps, etc.

The battery control unit 7300 controls a secondary battery 7310 that is a power supply source of the drive motor according to various programs. For example, information, such as a battery temperature, a battery output voltage or the remaining capacity of the battery, is input from the battery device including the secondary battery 7310 to the battery control unit 7300. The battery control unit 7300 performs arithmetic operations, using these signals, and controls temperature adjustment on the secondary battery 7310 and controls a cooling system that the battery device includes, etc.

The vehicle external information detection unit 7400 detects information on the outside of the vehicle in which the vehicle control system 7000 is installed. For example, at least any one of an imaging unit 7410 and a vehicle external information detector 7420 is connected to the vehicle external information detection unit 7400. The imaging unit 7410 contains at least any one of a ToF (Time Of Flight) camera, a stereo camera, a monocular camera, an infrared camera, and other cameras. The vehicle external information detector 7420, for example, contains at least any one of an environment sensor for detecting the current weather or meteorological phenomenon and a surrounding information detection sensor for detecting another vehicle, an obstacle, a pedestrian, or the like, around the vehicle in which the vehicle control system 7000 is installed.

The environment sensor may be at least any one of a raindrop sensor that detects raining, a fog sensor that detects fog, a solar radiation sensor that detects a degree of solar radiation, and a snow sensor that detects snowing. The surrounding information detection sensor may be at least any one of an ultrasound sensor, a radar device and a LIDAR (Light Detection and Ranging, Laser Imaging Detection and Ranging) device. Each of the imaging unit 7410 and the vehicle external information detector 7420 may be included as an independent sensor or device or may be included as a device obtained by integrating multiple sensors or devices.

Figure 30:
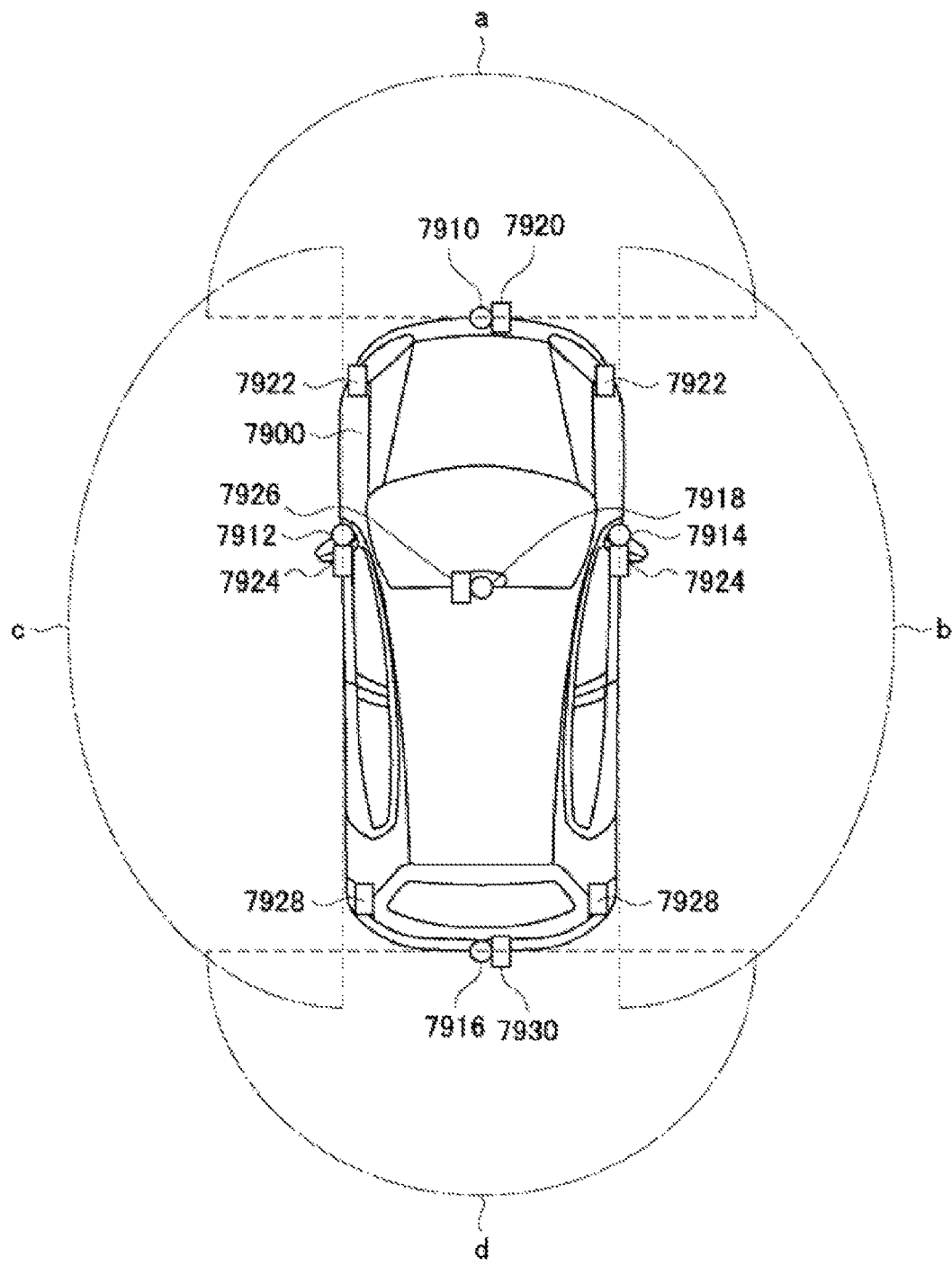
FIG. 30 is an illustration of an example of positions in which a vehicle external information detector and an imaging unit are set.

FIG. 30 illustrates an example of positions in which the imaging unit 7410 and the vehicle external information detector 7420 are set. An imaging unit 7910, 7912, 7914, 7916 or 7918 is, for example, set in at least any one of positions of a front nose, a side-view mirror, a rear bumper, a back door and a vehicle internal upper part of a windshield of a vehicle 7900. The imaging unit 7910 that the front nose has and the imaging unit 7918 that the vehicle internal upper part of the windshield has mainly acquire images of the landscape ahead of the vehicle 7900. The imaging units 7912 and 7914 that the side-way mirrors have mainly acquire images of landscapes on lateral sides of the vehicle 7900. The imaging unit 7916 that the rear bumper or the back door has acquires images of the landscape behind the vehicle 7900. The imaging unit 7918 that the vehicle internal upper part of the windshield is mainly used to detect a preceding vehicle, a pedestrian, an obstacle, a traffic light, a traffic light, a traffic sign, a driving lane, etc.

FIG. 30 illustrates an example of areas of imaging by the respective imaging units 7910, 7912, 7914 and 7916. An imaging area a represents an area of imaging by the imaging unit 7910 that is arranged on the front nose, imaging areas b and c represent areas of imaging by the imaging units 7912 and 7914 that are arranged on the side-way mirrors, and an imaging area d represents an area of imaging by the imaging unit 7916 that is arranged on the rear bumper or the back door. For example, superimposing sets of image data obtained by image capturing by the imaging units 7910, 7912, 7914 and 7916 makes it possible to obtain a bird's eye view image of the vehicle 7900 viewed from above.

Vehicle external information detectors 7920, 7922, 7924, 7926, 7928 and 7930 that are arranged on the front, rear, sides, corners and the vehicle internal upper part of the windshield may be, for example, ultrasound sensors or radar devices. The vehicle external information detectors 7920, 7926, and 7930 that are arranged on the front nose, the rear bumper, the back door and the vehicle internal upper part of the windshield of the vehicle 7900 may be, for example, LIDAR devices. The vehicle external information detectors 7920 to 7930 are mainly used to detect a preceding vehicle, a pedestrian, an obstacle, etc.

Returning to FIG. 29, description will be continued. The vehicle external information detection unit 7400 causes the imaging unit 7410 to capture images of the outside of the vehicle and receives the image data obtained by image capturing. The vehicle external information detection unit 7400 receives detection information from the vehicle external information detector 7420 being connected. When the vehicle external information detector 7420 is a radar device or a LIDAR device, the vehicle external information detection unit 7400 causes emission of ultrasound, radio waves, or the like, and receives information on reflection waves that are received. The vehicle external information detection unit 7400 may perform a process of detecting an object, such as a vehicle, an obstacle, a sign, characters on a road surface, or the like, or a distance detection process based on the received information. The vehicle external information detection unit 7400 may perform an environment recognition process or recognizing raining, fog, the road surface state, or the like, based on the received information. The vehicle external information detection unit 7400 may calculate a distance to an object outside the vehicle based on the received information.

The vehicle external information detection unit 7400 may perform an image recognition process of recognizing a person, a vehicle, an obstacle, a sign, characters on a road surface, or the like, or a distance detection process based on the received image data. The vehicle external information detection unit 7400 may perform a process of distortion correction or alignment on the received image data and synthesize the image data obtained by image capturing by another imaging unit 7410, thereby generating a bird's eye view image or a panorama image. The vehicle external information detection unit 7400 may perform a viewing conversion process, using image data obtained by image capturing by another imaging unit 7410.

The vehicle internal information detection unit 7500 detects information on the inside of the vehicle. For example, a driver state detector 7510 that detects the state of a driver is connected to the vehicle internal information detection unit 7500. The driver state detector 7510 may contain a camera that captures images of the driver, a biological sensor that detects biological information of the driver, a microphone that collects sound inside the vehicle, or the like. The biological sensor is, for example, arranged on a seat surface, the steering wheel, or the like, and detects biological information of a person on board sitting on the seat or the driver who holds the steering wheel. The vehicle internal information detection unit 7500 may calculate a degree of tiredness or a degree of concentration of the driver or determine whether the driver is not drowsing based on detection information that is input from the driver state detector 7510. The vehicle internal information detection unit 7500 may perform a process, such as a noise canceling process, on the collected audio signals.

The integration control unit 7600 controls general operations in the vehicle control system 7000 according to various programs. An input unit 7800 is connected to the integration control unit 7600. The input unit 7800 is, for example, implemented by a device, such as a touch panel, a button, a microphone, a switch, or a lever, on which the person on board can perform input operations. Data that is obtained by performing audio recognition on sound that is input by the microphone may be input to the integration control unit 7600. The input unit 7800 may be, for example, a remote control device using infrared rays or other radio waves or may be an external connection device, such as a mobile phone or a PDA (personal Digital Assistant), corresponding to operations of the vehicle control system 7000. The input unit 7800 may be, for example, a camera and, in that case, the person on board is able to input information by gesture. Alternatively, data that is obtained by detecting motions of a wearable device that the person on board wears may be input. Furthermore, the input unit 7800 may contain an input control circuit that generates an input signal based on information that is input by the person on board, or the like, using the input unit 7800, and output the input signal to the integration control unit 7600. The person on board inputs various types of data to the vehicle control system 7000 and issues instructions of process operations by operating the input unit 7800.

The storage 7690 may contain a ROM (Read Only Memory) that stores various programs that are executed by the microcomputer and a RAM (Random Access Memory) that stores various parameters, arithmetic operation results, sensor values, or the like. The storage 7690 may be implemented by a magnetic storage device, such as a HDD (Hard Disc Drive), a semiconductor storage device, an optical storage device, a magneto-optical memory device, or the like.

The general-purpose communication I/F 7620 is a general-purpose communication I/F that mediates communication among various devices that are present in an external environment 7750. In the general-purpose communication I/F 7620, a cellular communication protocol, such as GSM (trademark) (Global System of Mobile communications), WiMAX (trademark) (trademark), LTE (Long Term Evolution) or LTE-A (LTE-Advanced), or another wireless communication protocol, such as wireless LAN (Wi-Fi (trademark)) or Bluetooth (trademark) may be implemented. The general-purpose communication I/F 7620, for example, may be connected to a device (for example, an application server or a control server) that is present on an external network (for example, the Internet, a cloud network, or a network unique to a business operator) via a base station or an access point. The general-purpose communication I/F 7620, for example, may be connected to a terminal (for example, a terminal device of a driver, a pedestrian or a store or a MTC (Machine Type Communication) terminal) that is present near the vehicle by the P2P (Peer To Peer) technique.

The dedicated communication I/F 7630 is a communication I/F that supports a communication protocol that is designed for the purpose of use in a vehicle. In the dedicated communication I/F 7630, for example, a standard protocol, such as WAVE (Wireless Access in Vehicle Environment) that is a combination of IEEE802.11p of a lower layer and IEEE1609 of an upper layer, DSRC (Dedicated Short Range Communications), or a cellular communication protocol, is implemented. The dedicated communication I/F 7630 typically executes V2X communication that is an idea containing at least any one of vehicle to vehicle communication, vehicle to infrastructure communication, vehicle to home communication and vehicle to pedestrian communication.

The positioning unit 7640, for example, receives GNSS signals from GNSS (Global Navigation Satellite System) satellites (for example, GPS signals from GPS (Global Positioning System) satellites), executes positioning, and generates positional information containing the longitude, latitude, and altitude of the vehicle. The positioning unit 7640 may specify the current position by exchanging signals with a wireless access point or acquire positional information from a terminal device, such as a mobile phone, a PHS, or a smartphone, with a positioning function.

The beacon receiver 7650 receives radio waves or electromagnetic waves that are emitted from a radio station that is set on a road, or the like, and acquires information, such as the current position, congestion, closure, or a time required. The function of the beacon receiver 7650 may be contained in the dedicated communication I/F described above.

The vehicle internal device I/F 7660 is a communication interface that intermediates connection between the microcomputer 7610 and various vehicle internal devices 7760. The vehicle internal device I/F 7660 may establish wireless connection, using a wireless communication protocol, such as wireless LAN, Bluetooth (trademark), NFC (Near Field Communication), or WUSB (Wireless USB). The vehicle internal device I/F 7660 may establish wired connection by USB (Universal Serial Bus), HDMI (trademark) (High-Definition Multimedia Interface or MHL (Mobile High-Definition Link)) via a connection terminal not illustrated in the drawing (and a cable if required). The vehicle internal device 7760, for example, may contain at least any one of a mobile device or a wearable device that a person on board has and an information device that is brought into or attached to the vehicle. The vehicle internal device 7760 may contain a navigation device that performs route search to a freely-selected destination. The vehicle internal device I/F 7660 exchanges control signals or data signals with the vehicle internal devices 7760.

The on-board network I/F 7680 is an interface that intermediates communication between the microcomputer 7610 and the communication network 7010. The on-board network I/F 7680 transmits and receives signals, etc., according to a given protocol that is supported by the communication network 7010.

The microcomputer 7610 of the integration control unit 7600 controls the vehicle control system 7000 according to various programs based on information that is acquired via at least any one of the general-purpose communication I/F 7620, the dedicated communication I/F 7630, the positioning unit 7640, the beacon receiver 7650, the vehicle internal device I/F 7660, and the on-board network I/F 7680. For example, based on the acquired information on the inside and outside of the vehicle, the microcomputer 7610 computes a control target value of the drive force generation device, the steering mechanism, or the control device and outputs a control instruction to the drive system control unit 7100. For example, the microcomputer 7610 may perform cooperative control aimed at implementation of a function of ADAS (Advanced Driver Assistance System) containing avoidance of crash of the vehicle or crash attenuation, following travel based on the distance between vehicles, travel with the vehicle speed being maintained, crash alert, or alert to deviation of the vehicle from the lane. By controlling the drive force generation device, the steering mechanism, the control device, or the like, the microcomputer 7610 may perform cooperative control aimed at autonomous driving of autonomous travel not depending on operations by the driver.

The microcomputer 7610 may, based on information that is acquired via at least any one of the general-purpose communication I/F 7620, the dedicated communication I/F 7630, the positioning unit 7640, the beacon receiver 7650, the vehicle internal device I/F 7660, and the on-board network I/F 7680, generate three-dimensional distance information between the vehicle and an object, such as an object or a person around the vehicle, and create local map information containing the current position of the vehicle and surroundings information. The microcomputer 7610 may, based on the acquired information, predict a risk, such as crash of the vehicle, approach by a pedestrian, or the like, or entry to a closed road, and generate an alert signal. The alert signal may be, for example, a signal for generating an alert or causing an alert lamp to be turned on.

The audio image output unit 7670 transmits an output signal of at least any one of sound and an image to an output device capable of notifying a person on the vehicle or the outside of the vehicle of information visually or auditorily. In the example in FIG. 29, an audio speaker 7710, a display unit 7720, and an instrument panel 7730 are exemplified as the output device. The display unit 7720 may, for example, contain at least any one of an on-board display and a head-up display. The display unit 7720 may has an AR (Augmented Reality) display function. The output device may be another device other than these devices, such as headphones, a wearable device, such as a glasses display that the person on board wears, a projector, or a lamp. When the output device is a display device, the display device visually displays results obtained by various processes that are performed by the microcomputer 7610 or information that is received from another control unit in various forms, such as texts, an image, a table or a graph. When the output device is an audio output device, the audio output device converts an audio signal consisting of audio data or acoustic data that is reproduced into an analog signal and outputs the analog signal auditorily.

In the example illustrated in FIG. 29, at least two control units that are connected with each other via the communication network 7010 may be integrated into a single control unit. Alternatively, an individual control unit may consists of multiple control units. Furthermore, the vehicle control system 7000 may include another control unit that is not illustrated in the drawing. In the description above, part of or all the function played by any one of the control units may be played by another control unit. In other words, a given arithmetic operation may be performed by any one of the control units as long as information is transmitted and received via the communication network 7010. Similarly, a sensor or a device that is connected to any one of the control units may be connected to another control unit and multiple control units may transmit and receive detection information alternately via the communication network 7010.

Note that a computer program for implementing each function of the radar detection system 1 according to the embodiment described, using FIG. 4, can be installed in any one of the control units. A computer-readable recording medium in which such a computer program is stored can be provided. The recording medium is, for example, a magnetic disk, an optical disk, a magneto optical disk, or a flash memory. The computer program may be distributed via, for example, a network without any recording medium.

In the vehicle control system 7000 described above, the radar detection system 1 according to the embodiment described, using FIG. 4, is applicable to the integration control unit 7600 of Application Example illustrated in FIG. 29. For example, the controller 11, the subject vehicle information acquisition unit 12, the map information acquisition unit 16, the terrain information acquisition unit 17, the radar controller 21, the signal processor 28, and the object detection processor 29 correspond to the microcomputer 7610, the storage 7690, and the on-board network I/F 7680 of the integration control unit 7600.

At least part of the components of the radar detection system 1 described, using FIG. 4, may be implemented in a module (for example, an integrated circuit module consisting of a single dye) for the integration control unit 7600 that is illustrated in FIG. 29. Alternatively, the radar detection system 1 described, using FIG. 4, may be implemented by the control units of the vehicle control system 7000 illustrated in FIG. 29.

The embodiments of the disclosure have been described and the technical scope of the disclosure is not directly limited to the above-described embodiments and various changes can be made within the scope of the disclosure. Components over the different embodiments and modifications may be combined as appropriate.

The effects in each of the embodiments described herein are exemplified only and are not limited and there may be other effects.

Note that the technique can employ the following configuration.

(1)
A control device comprising:
a radar device configured to execute a first mode of detecting at least any one of a relative speed and a relative distance with respect to an object in a first area and a second mode of detecting at least any one of a relative speed and a relative distance with respect to an object in a second area in a field wider than that of the first area; and
a controller configured to switch a mode that is executed by the radar device to any one of the first mode and the second mode.

(2)
The control device according to (1), wherein the controller is configured to, based on environment information on circumstances around a vehicle in which the radar device is installed, switch the mode that is executed by the radar device to any one of the first mode and the second mode.

(3)
The control device according to (2), wherein the environment information contains at least any one of map data and terrain data on an area to which the vehicle belongs.

(4)
The control device according to (2) or (3), further comprising an imaging unit configured to capture an image of surroundings of the vehicle,
wherein the environment information contains image data that is acquired by the imaging unit.

(5)
The control device according to any one of (2) to (5), further comprising a ranging unit configured to measure a distance to an object that is present around the vehicle,
wherein the environment information contains the distance to the object that is measured by the ranging unit.

(6)
The control device according to any one of (1) to (5), wherein the controller is configured to, based on subject vehicle information on a vehicle in which the radar device is installed, switch the mode that is executed by the radar device to anyone of the first mode and the second mode.

(7)
The control device according to (6), wherein the subject vehicle information contains information on a speed of the vehicle.

(8)
The control device according to any one of (2) to (5), wherein the controller is configured to set the mode that is executed by the radar device at the first mode while the vehicle is traveling a downtown or a residence area.

(9)
The control device according to (8), wherein the controller is configured to set the mode that is executed by the radar device at the second mode while the vehicle is traveling a toll road or outskirts.

(10)
The control device according to any one of (1) to (9), wherein the radar device further includes a transmitting antenna and a receiving antenna, wherein each of the transmitting antenna and the receiving antenna is a phased array antenna in which a plurality of antenna elements are arrayed.

(11)

The control device according to (10), wherein the radar device is configured to send out a signal, using a first number of antenna elements out of the antenna elements in the transmitting antenna, when executing the first mode and send out a signal, using a second number of antenna elements that is larger than the first number out of the antenna elements in the transmitting antenna, when executing the second mode.

(12)

The control device according to (10) or (11), wherein the radar device is configured to send out a signal in a first period from the transmitting antenna during execution of the first mode and send out a signal in a second period that is the same as the first period from the transmitting antenna during execution of the second mode.

(13)

The control device according to (10), wherein the radar device is configured to further execute a third mode of changing a direction in which the transmitting antenna sends out a signal and a direction in which the receiving antenna receives a signal in a linked manner and a fourth mode of changing the direction in which the transmitting antenna sends out a signal and a direction in which the receiving antenna receives a signal independently, and the controller is configured to switch the mode that is executed by the radar device to any one of the third mode and the fourth mode.

(14)

The control device according to (13), wherein the controller is configured to set the mode that is executed by the radar device at the fourth mode while a vehicle in which the radar device is installed is traveling a specific area and set the mode that is executed by the radar device at the third mode while the vehicle is traveling an area other than the specific area.

(15)

The control device according to (14), wherein the specific area is in a tunnel or is an area before an ascending slope.

(16)

The control device according to (10), further comprising a radar transmission processor configured to generate a signal to be sent out of the transmitting antenna, wherein the controller is configured to change a bandwidth of the signal that is generated by the radar transmission processor.

(17)

The control device according to (16), wherein the controller is configured to set the bandwidth of the signal that is generated by the radar transmission processor at a first bandwidth while a vehicle in which the radar device is installed is traveling a toll road or outskirts and set the bandwidth of the signal that is generated by the radar transmission processor at a second bandwidth that is wider than the first bandwidth while the vehicle is traveling a downtown or a residence area.

(18)

The control device according to (10), wherein the radar device further includes a radar reception processor configured to remove a signal of which signal intensity is under a threshold from an echo signal that is received by the receiving antenna, and the controller is configured to change the threshold that is set in the radar reception processor.

(19)

A control method comprising:
causing a radar device to execute a first mode of detecting at least any one of a relative speed and a relative distance with respect to an object in a first area;
causing the radar device to execute a second mode of detecting at least any one of a relative speed and a relative distance with respect to an object in a second area in a field wider than that of the first area; and
switching a mode that is executed by the radar device to any one of the first mode and the second mode.

(20)

A sensor control system comprising:
an imaging unit;
a ranging unit configured to measure a distance to an object that is present in surroundings;
an information acquisition unit configured to acquire at least any one of map data and terrain data on an area to which a subject belongs;
a radar device configured to detect at least any one of a relative speed and a relative distance with respect to the object, using millimeter waves; and
a controller configured to control the radar device, wherein
the radar device is configured to execute a first mode of detecting at least any one of the relative speed and the relative distance with respect to the object in a first area and a second mode of detecting at least any one of a relative speed and a relative distance with respect to the object in a second area in a field wider than that of the first area, and
the controller is configured to, based on at least any one of image data that is acquired by the imaging unit, the distance to the object that is acquired by the ranging unit, and the map data and/or the terrain data that is acquired by the information acquisition unit, switch a mode that is executed by the radar device to any one of the first mode and the second mode.

REFERENCE SIGNS LIST

1 RADAR DETECTION SYSTEM
11 CONTROLLER
12 SUBJECT VEHICLE INFORMATION ACQUISITION UNIT
13 ANGLE SENSOR
14 SPEED-ACCELERATION SENSOR
15 POSITION SENSOR
16 MAP INFORMATION ACQUISITION UNIT
17 TERRAIN INFORMATION ACQUISITION UNIT
18 IMAGING UNIT
19 RANGING UNIT
20 RADAR DEVICE
21 RADAR CONTROLLER
22 RADAR TRANSMISSION PROCESSOR
23 TRANSMITTING ANTENNA
24 RECEIVING ANTENNA
25 MIXER
26 RADAR RECEPTION PROCESSOR
27 AD CONVERTER
28 SIGNAL PROCESSOR
29 OBJECT DETECTION PROCESSOR
30 OBJECT
231, 241 ANTENNA ELEMENT
100 VEHICLE
101 TRANSMISSION WAVE (TRANSMISSION SIGNAL)

121, 122 ECHO SIGNAL
921 AUTOMOBILE
922 PEDESTRIAN
923 BICYCLE
924 TRAFFIC LIGHT
925 PRECEDING VEHICLE
AR, AR1, AR2, AR3 BEAM AREA

The invention claimed is:

1. A control device, comprising:
a radar device configured to:
execute a first mode of object detection to detect at least one of a relative speed or a relative distance of a vehicle with respect to a first object in a first area in which the vehicle is traveling; and
execute a second mode of the object detection to detect the at least one of the relative speed or the relative distance of the vehicle with respect to a second object in a second area in which the vehicle is traveling, wherein
the second area is different from the first area, and
a field of the second area is wider than a field of the first area; and
a controller configured to switch a mode of the object detection that is executed by the radar device to one of the first mode or the second mode.

2. The control device according to claim 1, wherein
the controller is further configured to switch the mode of the object detection to one of the first mode or the second mode based on environment information associated with circumstances around the vehicle, and
the radar device is installed in the vehicle.

3. The control device according to claim 2, wherein the environment information contains at least one of map data or terrain data on one of the first area or the second area to which the vehicle belongs.

4. The control device according to claim 2, further comprising an imaging unit configured to capture an image of surroundings of the vehicle,
wherein the environment information contains image data associated with the captured image that is acquired by the imaging unit.

5. The control device according to claim 2, further comprising a ranging unit configured to measure a distance from the vehicle to one of the first object or the second object that is present around the vehicle,
wherein the environment information contains the distance that is measured by the ranging unit.

6. The control device according to claim 1, wherein
the controller is further configured to switch the mode of the object detection to one of the first mode or the second mode based on subject vehicle information associated with the vehicle, and
the radar device is installed in the vehicle.

7. The control device according to claim 6, wherein the subject vehicle information contains information associated with a speed of the vehicle.

8. The control device according to claim 2, wherein
the controller is configured to set the mode of the object detection at the first mode while the vehicle is traveling in the first area which corresponds to at least one of a downtown area or a residence area.

9. The control device according to claim 8, wherein the controller is further configured to set the mode of the object detection at the second mode while the vehicle is traveling in the second area which corresponds to at least one of a toll road or an outskirts area.

10. The control device according to claim 1, wherein the radar device includes;
a transmitting antenna; and
a receiving antenna, wherein
each of the transmitting antenna and the receiving antenna is a phased array antenna in which a plurality of antenna elements are arrayed.

11. The control device according to claim 10, wherein the radar device is further configured to:
send out a first signal, via a first number of antenna elements of the plurality of antenna elements in the transmitting antenna, based on the execution of the first mode; and
send out a second signal, via a second number of antenna elements of the plurality of antenna elements in the transmitting antenna, based on the execution of the second mode, wherein
the second number of antenna elements is larger than the first number of the antenna elements.

12. The control device according to claim 10, wherein the radar device is further configured to:
send out a first signal in a first period from the transmitting antenna during the execution of the first mode; and
send out a second signal in a second period from the transmitting antenna during the execution of the second mode, wherein the second period is same as the first period.

13. The control device according to claim 10, wherein the radar device is further configured to execute;
a third mode to change a first direction in which the transmitting antenna sends out a first signal and a second direction in which the receiving antenna receives a second signal in a linked manner such that the first direction is linked with the second direction; and
a fourth mode of changing the first direction in which the transmitting antenna sends out the first signal and the second direction in which the receiving antenna receives the second signal independently, and
the controller is configured to switch the mode of the object detection to one of the third mode or the fourth mode.

14. The control device according to claim 13, wherein the controller is further configured to:
set the mode of the object detection at the fourth mode while the vehicle is traveling in a specific area; and
set the mode of the object detection at the third mode while the vehicle is traveling in an area other than the specific area, and
the radar device is installed in the vehicle.

15. The control device according to claim 14, wherein the specific area is one of an area in a tunnel or an area before an ascending slope.

16. The control device according to claim 10, further comprising a radar transmission processor configured to generate a signal to be sent out of the transmitting antenna,
wherein the controller is further configured to change a bandwidth of the generated signal.

17. The control device according to claim 16, wherein the controller is further configured to:
set the bandwidth of the signal at a first bandwidth while the vehicle is traveling on one of a toll road or outskirts; and
set the bandwidth of the signal at a second bandwidth, that is wider than the first bandwidth, while the vehicle is traveling in one of a downtown area or a residence area.

18. The control device according to claim 10, wherein
the radar device further includes a radar reception processor configured to:
  set a threshold signal intensity to remove a noise from an echo signal that is received by the receiving antenna; and
  remove a signal, whose signal intensity is less than the set threshold signal intensity, from the echo signal, and
the controller is further configured to change the set threshold value.

19. A control method, comprising:
executing, by a radar device, a first mode of object detection for detecting at least one of a relative speed or a relative distance with respect to a first object in a first area in which a vehicle is traveling;
executing, by the radar device, a second mode of the object detection for detecting at least one of the relative speed or the relative distance with respect to a second object in a second area in which the vehicle is traveling, wherein
  the second area is different from the first area, and
  a field of the second area is wider than a field of the first area; and
switching, by a controller, a mode of the object detection that is executed by the radar device to one of the first mode or the second mode.

20. A sensor control system, comprising:
an imaging unit configured to capture an image of surroundings of a vehicle;
a ranging unit configured to measure a distance from the vehicle to one of a first object or a second object that is present in the surroundings of the vehicle;
an information acquisition unit configured to acquire at least one of map data or terrain data associated with one of a first area to which the first object belongs or a second area to which the second object belongs;
a radar device configured to detect at least one of a relative speed and a relative distance of the vehicle with respect to one of the first object or the second object, using millimeter waves, wherein the radar device is installed in the vehicle; and
a controller configured to control the radar device, wherein
  the radar device is further configured to:
    execute a first mode of object detection to detect at least one of the relative speed or the relative distance of the vehicle with respect to the first object in the first area; and
    execute a second mode of the object detection to detect the at least one of the relative speed or the relative distance of the vehicle with respect to the second object in the second area, wherein
      the second area is different from the first area, and
      a field of the second area is wider than a field of the first area, and
  the controller is configured to switch a mode of the object detection that is executed by the radar device to one of the first mode or the second mode based on at least one of image data associated with the captured image, the distance from the vehicle to one of the first object or the second object, the map data or the terrain data.

* * * * *